US 9,552,328 B2

(12) United States Patent
Higuchi et al.

(10) Patent No.: US 9,552,328 B2
(45) Date of Patent: Jan. 24, 2017

(54) RECONFIGURABLE INTEGRATED CIRCUIT DEVICE

(75) Inventors: Hayato Higuchi, Yokohama (JP);
Takashi Hanai, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 608 days.

(21) Appl. No.: 13/458,255

(22) Filed: Apr. 27, 2012

(65) Prior Publication Data

US 2013/0002292 A1 Jan. 3, 2013

(30) Foreign Application Priority Data

Jun. 30, 2011 (JP) .................................. 2011-145232

(51) Int. Cl.
*H03K 19/173* (2006.01)
*G06F 15/78* (2006.01)

(52) U.S. Cl.
CPC ....... *G06F 15/7875* (2013.01); *G06F 15/7867* (2013.01)

(58) Field of Classification Search
CPC .. G06F 15/7867; G06F 15/80; G06F 15/8023; G06F 9/3885; G06F 9/3001; G06F 7/57; G06F 15/7875; G06F 15/8007; G06F 9/3897; G06F 9/3887; G06F 9/3893; G06F 17/505; G06F 17/5054; G06F 1/12; Y02B 60/1207; Y02B 60/1225; H03K 19/17728; H03K 19/1733; H03K 19/1737; H03K 19/17732; H03K 19/17776; H03K 19/17756

(Continued)

(56) References Cited

U.S. PATENT DOCUMENTS

2004/0260742 A1* 12/2004 Natsume ........................ 708/700
2005/0289328 A1* 12/2005 Kasama ........................ 712/228
(Continued)

FOREIGN PATENT DOCUMENTS

JP 2006-11924 1/2006
JP 2006-018514 1/2006
(Continued)

OTHER PUBLICATIONS

Japanese Office Action mailed Jan. 6, 2015 in corresponding Japanese Patent Application No. 2011-145232 (4 pages) (2 pages English Translation).

*Primary Examiner* — Alexander H Taningco
*Assistant Examiner* — Seokjin Kim
(74) *Attorney, Agent, or Firm* — Staas & Halsey LLP

(57) ABSTRACT

A reconfigurable integrated circuit device includes plural processing elements each including an arithmetic circuit, and being configured in any computing state based on the configuration data; and an inter-processing element network which connects the processing elements in any state based on the configuration data. And the processing element inputs an input valid signal and an input data signal, and outputs an output valid signal and an output data signal, and includes an input data holding register, an arithmetic processing circuit, and an output data holding register which holds the computing result data, and when the configuration is updated by configuration data which makes a hold mode valid, regardless of the input valid signal, valid or invalid, the input data holding register holds the input data signal upon the update and the arithmetic processing circuit performs computing processing on the input data signal held in the input data holding register.

10 Claims, 17 Drawing Sheets

(58) Field of Classification Search
USPC ........ 326/37–41, 47; 708/230–236; 711/114, 711/220; 712/11–16; 714/770
See application file for complete search history.

(56) References Cited

U.S. PATENT DOCUMENTS

| | | |
|---|---|---|
| 2006/0004940 A1 | 1/2006 | Saito et al. |
| 2007/0198619 A1* | 8/2007 | Kasama et al. ............... 708/200 |
| 2007/0234013 A1* | 10/2007 | Saito ................... G06F 15/7867 712/220 |
| 2010/0257335 A1 | 10/2010 | Hanai et al. |
| 2011/0047353 A1* | 2/2011 | Matsuno .......................... 712/29 |

FOREIGN PATENT DOCUMENTS

| | | |
|---|---|---|
| JP | 2007-274397 | 10/2007 |
| JP | 2008-181361 | 8/2008 |
| JP | 2008181361 A * | 8/2008 |
| JP | 2010-244238 | 10/2010 |

* cited by examiner

RECONFIGURABLE INTEGRATED CIRCUIT DEVICE

CROSS-REFERENCE TO RELATED APPLICATION

This application is based upon and claims the benefit of priority of the prior Japanese Patent Application No. 2011-145232, filed on Jun. 30, 2011, the entire contents of which are incorporated herein by reference.

FIELD

The present invention relates to a reconfigurable integrated circuit device.

BACKGROUND

A reconfigurable integrated circuit device comprises a plurality of processing elements and a network for connecting these processing elements, and responding to an external or internal event, a sequencer sets configuration data, which is data for configuring a circuit, in the processing elements and the network, and the processing elements and the network configure any computing state or an arithmetic circuit according to this configuration data. A conventional general programmable microprocessor reads instructions stored in a memory in order, and processes the instructions sequentially. Since the hardware configuration of the microprocessor is standardized, the processor must execute programs combining limited instructions in order to perform various different processings, therefore decreasing the processing time has a certain limitation.

The reconfigurable integrated circuit device, on the other hand, comprises: a plurality of processing elements having a plurality of types of arithmetic circuits, including an arithmetic logic unit (ALU) having a computing function, such as an adder, a multiplier and a comparator, a delay circuit and a counter; and a network which connects the processing elements. If the plurality of processing elements and the network are configured into a desired configuration using configuration data, a desired computation is executed in this computing state. If data processing in one computing state completes, another computing state is constructed by another configuration data, and different data processing is executed in this state.

By switching configuration data like this, a different computing state is dynamically configured, and operation of a virtually large circuit is executed by time-division. Since each processing element is a dedicated hardware circuit, processing is faster than the case of a microprocessor executing a program. A reconfigurable integrated circuit device is disclosed in Japanese Patent Application Laid-Open No. 2010-244238, Japanese Patent Application Laid-Open No. 2007-274397 and Japanese Patent Application Laid-Open No. 2006-11924.

SUMMARY

The unit of the above mentioned divided circuits is called a "context". Among the operation methods of dynamically reconfigurable circuits, a method for implementing a target circuit operation by switching the contexts is called a "multi-context method". Recently the circuit design of an LSI is performed by converting a circuit description file, described by such hardware description languages as RTL, into a format which is executed on dynamically reconfigurable circuits, using a dedicated compiler. In other words, the dedicated compiler performs conversion processing including dividing contexts, combining circuits in each context and wiring, corresponding to the physical limitations of the circuits on an LSI.

As described above, in the case of switching a plurality of contexts in a several clock cycle, computing data must be transferred between continuous contexts. Generally data generated by a circuit of a context is written in such a register file as a RAM or LUT, a circuit in the next context reads the data from the register file, and performs target processing. If data is transferred between contexts, which are continuous in time, using a register file like this, a register file to write data in the previous context and a register file to read the data in the subsequent context are required. This increases consumption of circuit resources and wiring resources, and interrupts efficient reconfiguration.

According to an embodiment, a reconfigurable integrated circuit device, which is configured in any computing state based on configuration data, includes: a plurality of processing elements each of which includes an arithmetic circuit, and which can be configured in any computing state based on the configuration data; and an inter-processing element network which connects the plurality of processing elements in any state based on the configuration data, wherein the processing element inputs an input valid signal and an input data signal, and outputs an output valid signal and an output data signal, and includes an input data holding register, an arithmetic processing circuit which computes the input data signal, and an output data holding register which holds the computing result data of the arithmetic processing circuit, and when the configuration is updated by configuration data which makes a hold mode valid, regardless whether the input valid signal is valid or invalid, the input data holding register holds the input data signal upon the update and the arithmetic processing circuit performs computing processing on the input data signal which is held in the input data holding register.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
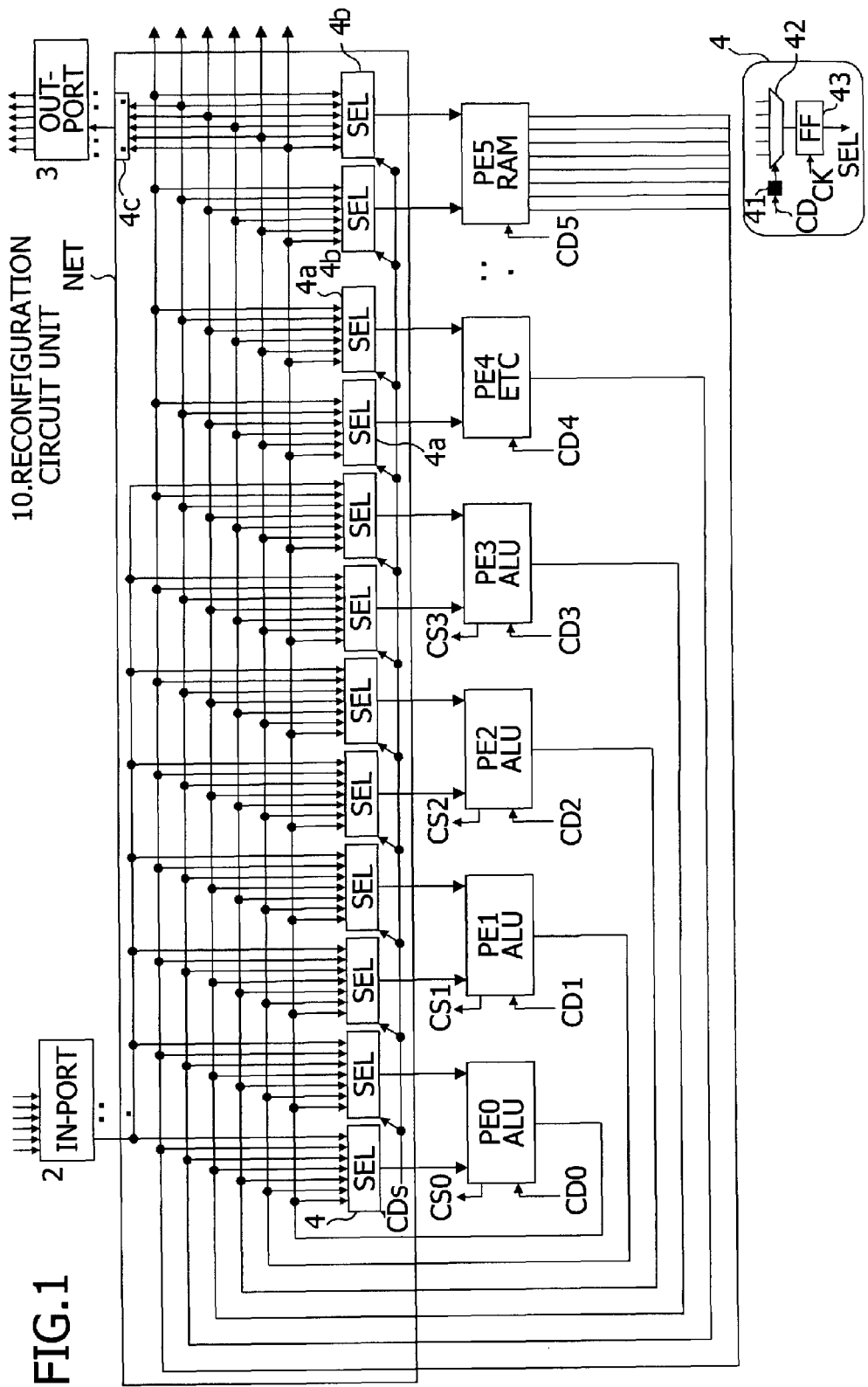
FIG. 1 is a configuration example of a reconfiguration circuit unit of a reconfigurable integrated circuit device according to the present embodiment.

FIG. 1 is a configuration example of a reconfiguration circuit unit of a reconfigurable integrated circuit device according to the present embodiment. Processing elements PE0 to PE3, a memory processing element PE5 and another processing element PE4 are connected arbitrarily via a selector 4 in an inter-processor network NET. Each of the processing units PE0 to PE5 are configured into any configuration based on configuration data CD0 to CD5. The selector 4 (4a, 4b, 4c) in the network NET is also configured into any connection status based on configuration data CDs. In other words, a pair of selectors 4, which correspond to two inputs of each processing element, selects one out of the outputs of the other processing elements and the inputs of input ports 2 based on the configuration data CD for the selector. Then the processing element PE computes two input data, and outputs one output data. These inputs and the output are data having a predetermined number of bits.

As depicted in the lower right of FIG. 1 as an example, the selector 4 comprises a register 41 which stores the configuration data CD, a selector circuit 42 which selects an input according to the data in the register 41, and a flip-flop 43 which latches output of the selector circuit 42 synchronizing with the clock CK. The network NET allows a desired connection with an input port 2 and an output port 3 of the data via the selector 4.

The reconfigurable integrated circuit device according to this embodiment has processing elements which are reconfigured in the hold mode. Normally a processor element computes input data when an input valid signal is valid, and outputs the computing result data as output data, along with an output valid signal which indicates that this output data is valid. Thereby a processor element in the subsequent step, which is connected to the output terminal of the processor element, input and compute this output data as a valid input data based on the output valid signal.

Hold mode is an operation mode where input data is input and computed even if the input valid signal is not valid, and the valid output valid signal is output along with the output data, which is a computing result data, synchronizing with the output timing of the output data. Thereby input data when the input valid signal is invalid, in the case when context is updated by the update of the configuration data, is input and computed. As a result, the output data of the processor element in the first context, before the configuration is updated, would be directly transferred, without using a register file, to a processor element in the second context after the configuration data is updated.

When the configuration data is updated, on the other hand, the processing element temporarily makes the output valid signal invalid, so as to disable data transfer between processing elements. This eliminates the possibility of a malfunction when updating the configuration data. The processing element being set in the hold mode input and compute the input data, even if the output valid signal is invalid.

Figure 2:
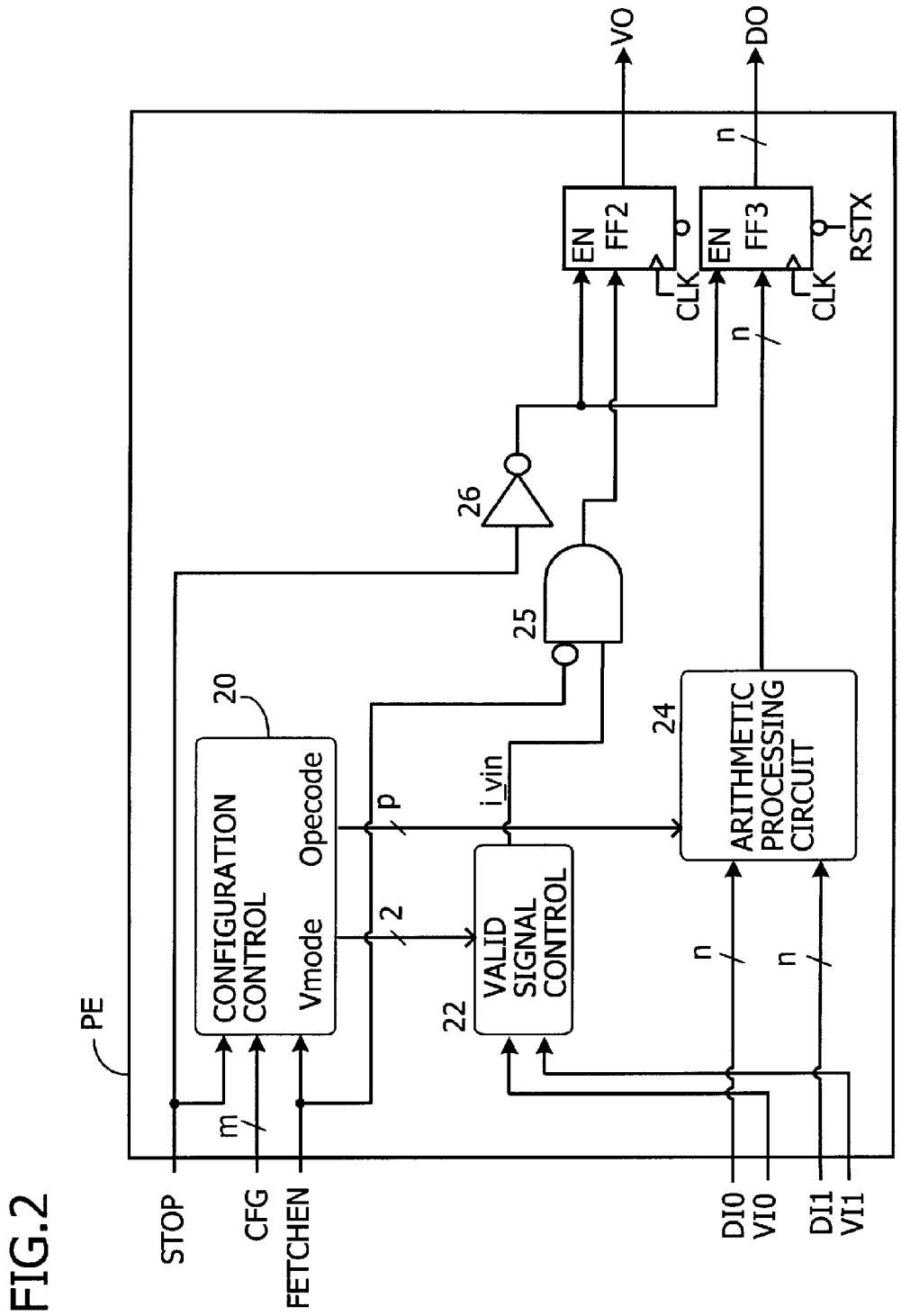
FIG. 2 is a block diagram of a processing element which has no hold mode.

FIG. 2 is a block diagram of a processing element which has no hold mode. In FIG. 2, a general clock and reset signal, which are known signals, are omitted. This processing element PE inputs two n-bit input data signals DI0 and DI1 along with one-bit input valid signals VI0 and VI1, and outputs n-bit output data signal DO, which is a result of computing the input data signal when the input valid signal is valid, along with one-bit output valid signal VO. The input valid signals VI0 and VI1 are signals which indicate whether or not the input data signals DI0 and DI1 are valid processing target data respectively. The output valid signal VO is a signal which indicates whether or not the output data signal DO is valid computing result data. This output valid signal VO becomes an input valid signal for the processing element connected in the subsequent step.

The processing element PE comprises: a configuration control circuit 20 which inputs configuration data CFG responding to a fetch enable signal FETCHEN, and distributes the configuration data inside; an arithmetic processing circuit 24 which computes the input data signals DI0 and DI1; a valid signal control circuit 22 which generates an internal input valid signal i_vin from the input valid signals VI0 and VI1 according to a valid mode signal Vmode; an output signal holding register FF2; and an output data holding register FF3. The arithmetic processing circuit 24 is configured according to an operation code OpeCode, which is supplied from the configuration control circuit 20. A stop signal STOP is a signal for stopping all the circuit operations in a debugging step, and the stop signal STOP is always in L level in a normal operation state.

Figure 3:
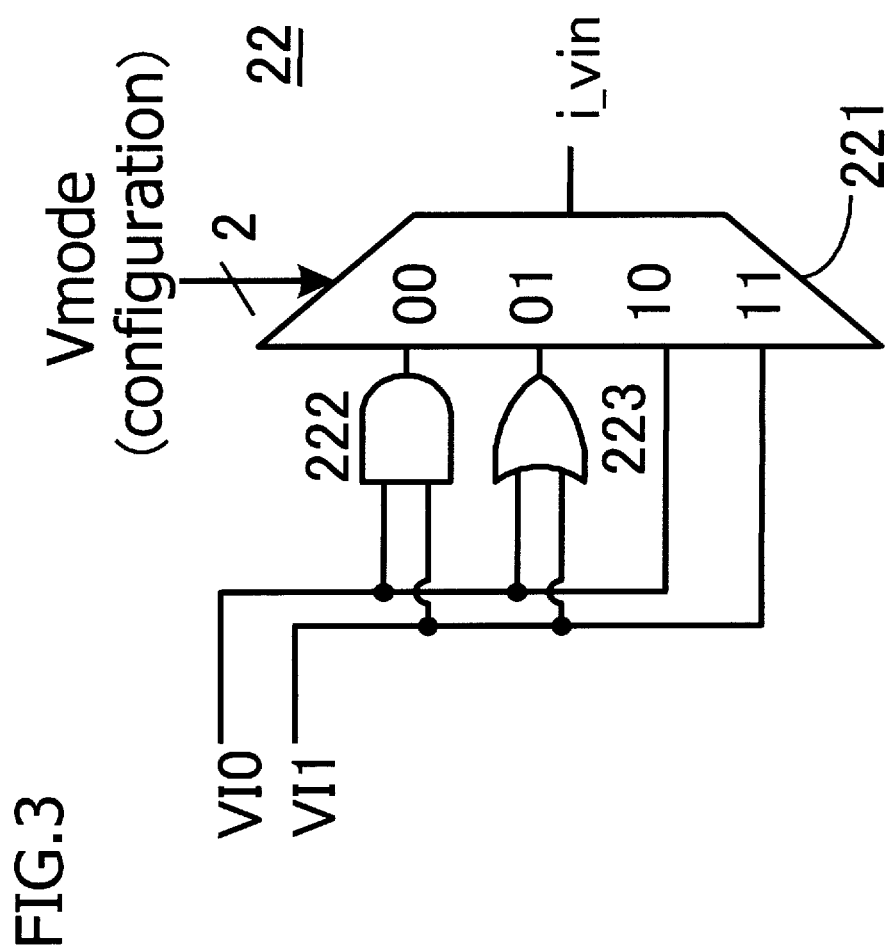
FIG. 3 is an example of a circuit diagram of the valid signal control circuit 22.

FIG. 3 is an example of a circuit diagram of the valid signal control circuit 22. There are four valid modes: a mode in which an internal valid signal i_vin is set to H level when both the input valid signals VI0 and VI1 are valid (H level); a mode in which the internal valid signal i_vin is set to H level when one of the input valid signals VI0 and VI1 is valid; a mode in which the internal valid signal i_vin is set to H level when the input valid signal VI0 is valid; and a mode in which the internal valid signal i_vin is set to H level when the input valid signal VI1 is valid. These four modes are distinguished by the valid mode signal Vmode. The valid signal control circuit 22 has a ¼ selector 221, and the selector 221 selects a signal corresponding to one of the four modes according to the two-bit valid mode signal Vmode, and outputs the selected signal as the internal valid signal i_vin.

Figure 4:
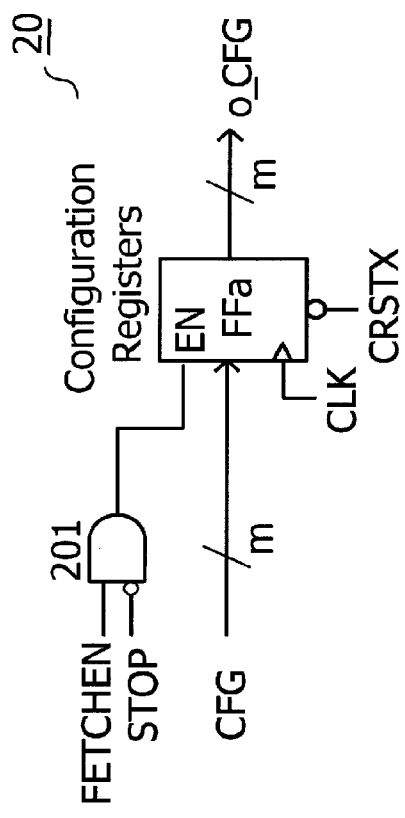
FIG. 4 is an example of the configuration control circuit 20.

FIG. 4 is an example of the configuration control circuit 20. The configuration control circuit 20 has a register FFa which latches the m-bit configuration data CFG generated when the fetch enable signal FETCHEN is H level, responding to the rise edge of the clock CLK, and outputs the configuration data o_CFG to the inside. The register FFa is a flip-flop. In normal a operation state, the stop signal STOP is in L level, hence the fetch enable signal FETCHEN is directly input as an enable signal of the flip-flop FFa via the AND gate 201. The latch state of the flip-flop is reset responding to a configuration reset signal CRSTX.

Figure 5:
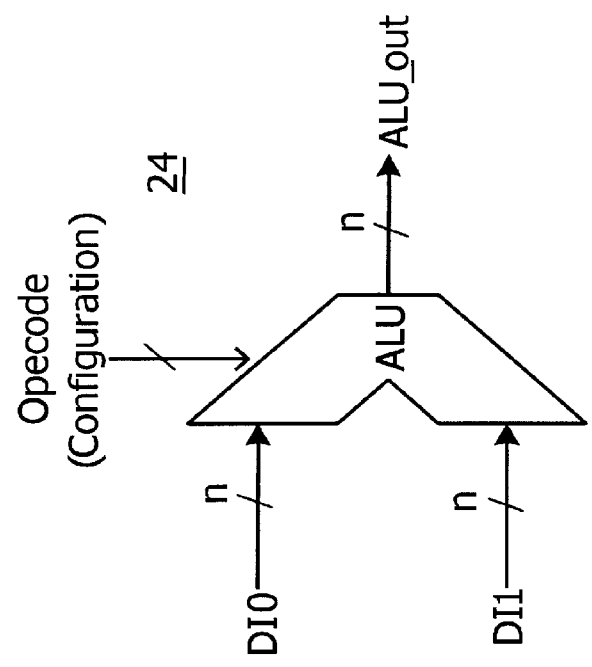
FIG. 5 is an example of the arithmetic processing circuit 24.

FIG. 5 is an example of the arithmetic processing circuit 24. The arithmetic processing circuit 24 has an arithmetic circuit ALU, which is reconfigured into various computing statuses by an operation OpeCode, the configured arithmetic circuit performs computing for two input data signals DI0 and DI1, and outputs the computed result as a computing result signal ALU_out. Reconfigurable computation includes arithmetic operation, shift operation, comparison operation and such logical operations as AND, OR, EXOR and NOT. Some processor elements may enclose a register file, such as RAM and LUT, as mentioned later.

Figure 6:
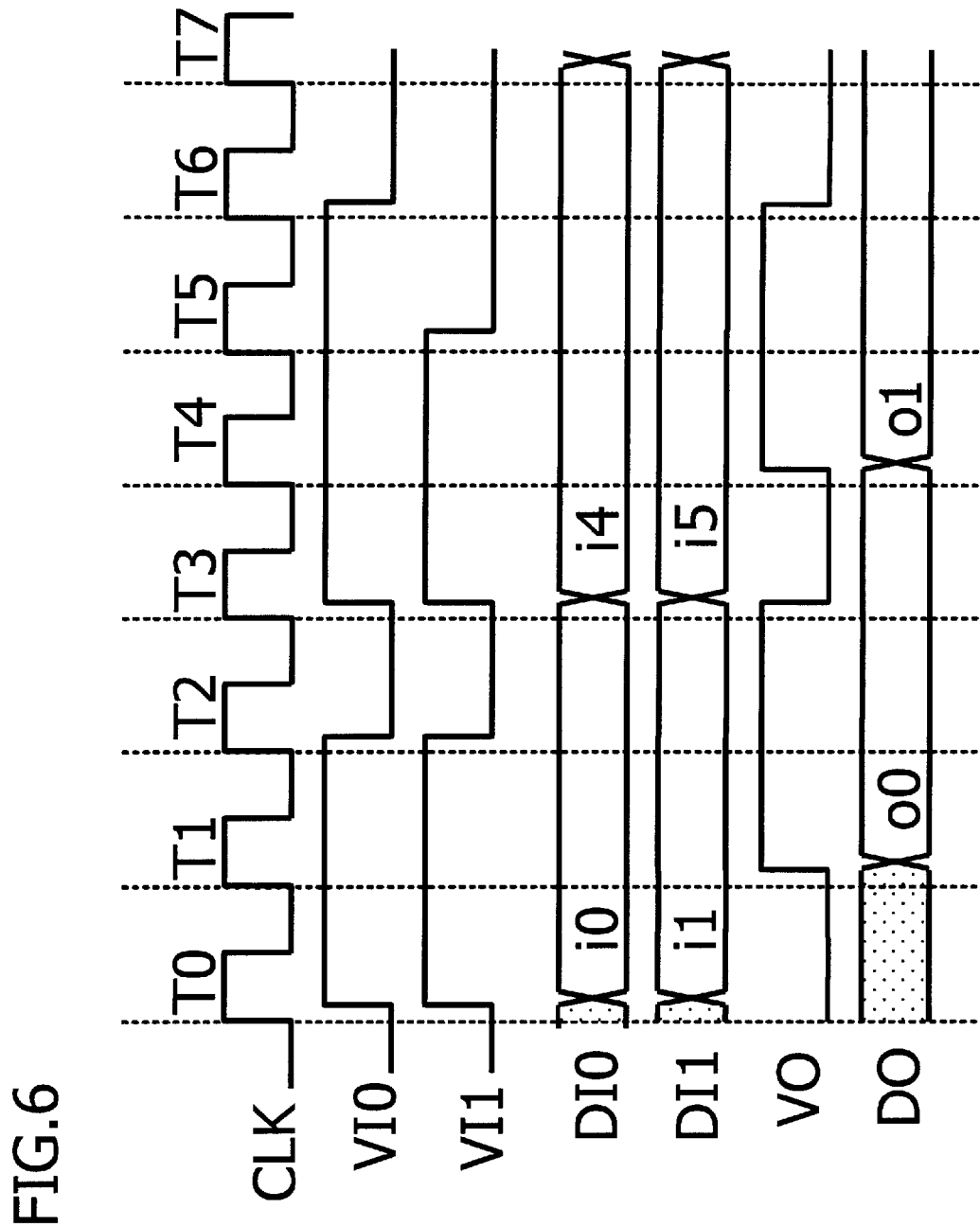
FIG. 6 is a diagram depicting a computing operation of a processing element in FIG. 2.

FIG. 6 is a diagram depicting a computing operation of a processing element in FIG. 2. In this example, the valid mode specified by the configuration data is Vmode=11, in which the internal valid signal i_vin is set to H level when both of the input valid signals VI0 and VI1 are in H level (valid). In other words, if both of the input data signals DI0 and DI1 are valid signals, the output data signal D0 of the computing result is output along with the valid output valid signal V0. The computing latency of the processing element in this example is one clock cycle.

First in the cycles T0 and T1 of the clock CLK, both the input valid signals VI0 and VI1 become H level (valid), and the data signals i0 and i1 are input as valid input signals DI0 and DI1. Then the arithmetic processing circuit 24 computes these input data signals i0 and i1, and in cycle T1 after one clock cycle latency, the data signal o0 is output as a valid output data signal V0 along with the H level (valid) of the output valid signal V0. In the same way, both the input valid signals VI0 and VI1 become H level in cycle T3, and the data signal i4 and i5 are input as valid input data signals DI0 and DI1, and in cycle T4 after one clock cycle latency, the data signal o1 is output as a valid output signal V0 along with the H level (valid) of the output valid signal V0.

In the processing element PE depicted in FIG. 2, the arithmetic processing circuit 24 directly inputs the input data signals DI0 and DI1, regardless the state of the input valid signals VI0 and VI1, and performs computation. This minimizes delay due to adding logic to the input data signal in the processing element PE, since a logic delay and wiring delay of the selector in the network NET, disposed in the former step of the input terminal of the processing element PE, and the arithmetic circuit in the processing element PE, become high as depicted in FIG. 1. Here "adding logic" means to insert a logic circuit to mask the input signals DI0 and DI1, depending on the state of the input valid signal, for example.

Responding to the input valid signals VI0 and VI1 in the valid state, however, the processing element PE outputs a valid output valid signal V0 after a latency required for the computing processing by the arithmetic processing circuit 24. Thereby the output data signal V0, which is a computing result data corresponding to the valid input data signals VI0 and VI1, is output along with the valid output valid signal V0. With respect to the input data signals DI0 and DI1, which are input along with the invalid input valid signal in cycle T2, the output valid signal V0 is in an invalid state in cycle T3, which is after one latency required for the computing processing. Therefore with respect to the output data signal D0 corresponding to the invalid input data signal in the cycle T2, the output valid signal V0 becomes invalid (L level). This is substantially the same as the processing element PE not executing computing processing for an invalid input data signal.

The latency of the arithmetic processing circuit is set according to the operation code OpeCode, and the output register FF2 for the output valid signal generates the output valid signal V0 at a timing corresponding to the latency.

Figure 7:
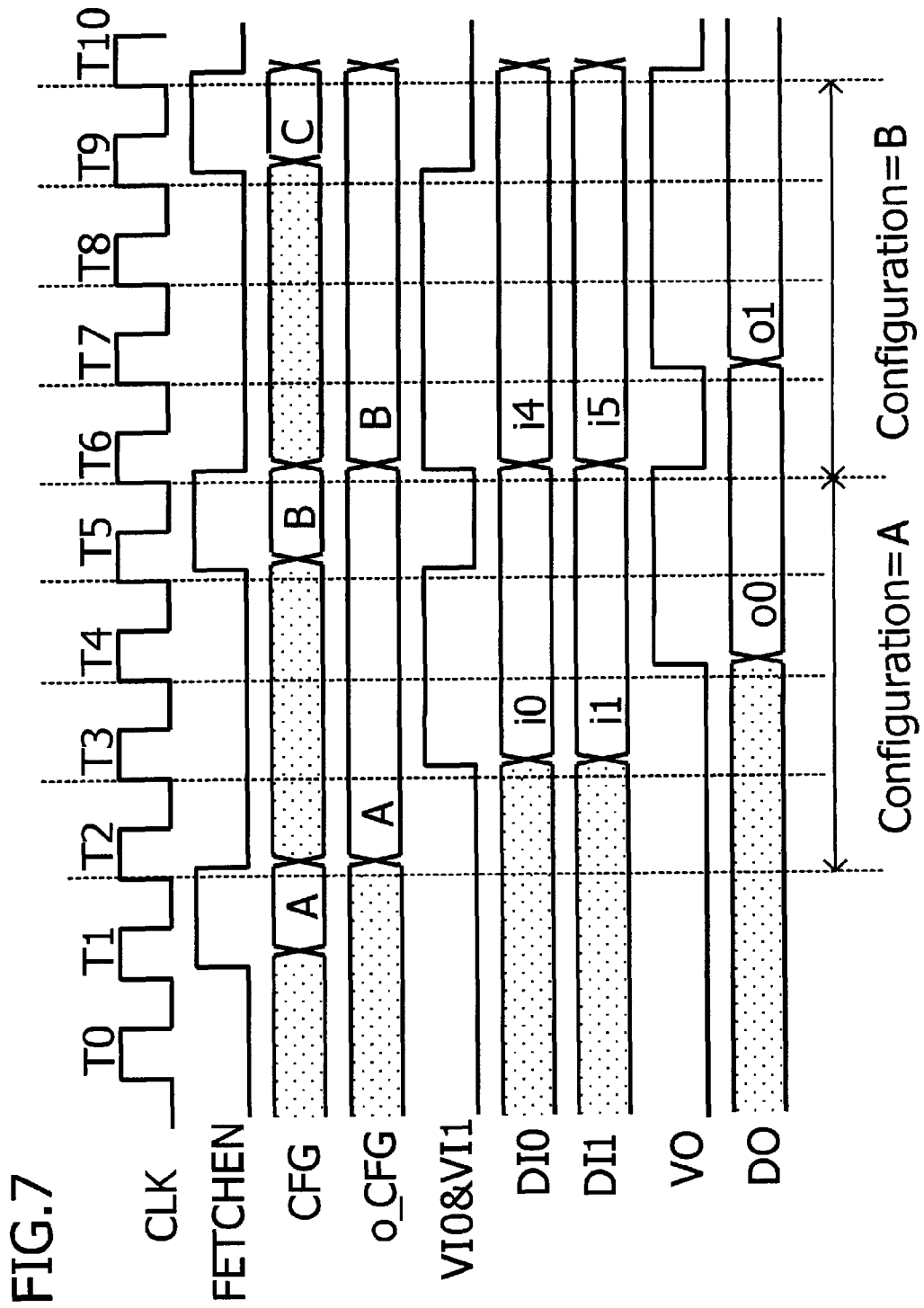
FIG. 7 is a diagram depicting computing operation when the configuration data of the processing element in FIG. 2 is updated.

FIG. 7 is a diagram depicting computing operation when the configuration data of the processing element in FIG. 2 is updated. In this example as well, the valid mode specified by the configuration data is Vmode=11, and the stop signal STOP is in L level.

In the example in FIG. 7, the fetch enable signal FETCHEN becomes H level and the configuration data CFG=A is input in cycle T1, and the processing element PE is configured to be the state of configuration A during the period of cycles T2 to T5. In the same way, the fetch enable signal FETCHEN becomes H level and the configuration data CFG=B is input in cycle T5, and the processing element PE is configured to be the state of configuration B during the period of cycles T6 to T9.

The configuration data CFG=A, which is input in the cycle T1, is latched by the configuration control circuit 20 at the rise edge of the clock CLK in the next cycle T2, and is supplied inside as the internal configuration data o_CFG, and as a result, the processing element PE is configured to be the state of configuration A. In other words, cycle T2 is a clock cycle where the configuration is updated. Then in cycle T3, the valid input valid signals VI0 and VI1 and the input data signals i0 and i1 are input, and in cycle T4 which is after one clock latency, the valid input valid signal V0 and the computing result o0 are output as the output data signal D0.

In the same way, the configuration data CFG=B, which is input in T5, is latched by the configuration control circuit 20 at the rise edge of the clock CLK in the next cycle T6, and is supplied inside as the internal configuration data o_CFG, and as a result, the processing element PE is configured to be the state of configuration B. In cycle T6, the valid input valid signals VI0 and VI1 and the input data signals i4 and i5 are input, and in cycle T7, which is after one clock latency, the valid output valid signal V0 and the computing result o1 are output as the output data signal D0.

In either configuration A or B, responding to H level of the fetch enable signal FETCHEN in cycle T1 or T5, the output valid signal V0 becomes invalid (L level) in the next cycle T2 or T6. This is due to the AND gate 25 in FIG. 2. Thus in cycles T2 and T6, where the configuration data is updated, the output valid signal V0 becomes L level, so as to prevent unintended propagation of data after the configuration is switched. In the configuration B however, the valid input valid signals VI0 and VI1 and the input data signals i4 and i5 have already been input in cycle T6. These are the input data signals from the processing element enclosing a register file, as mentioned later.

Figure 8:
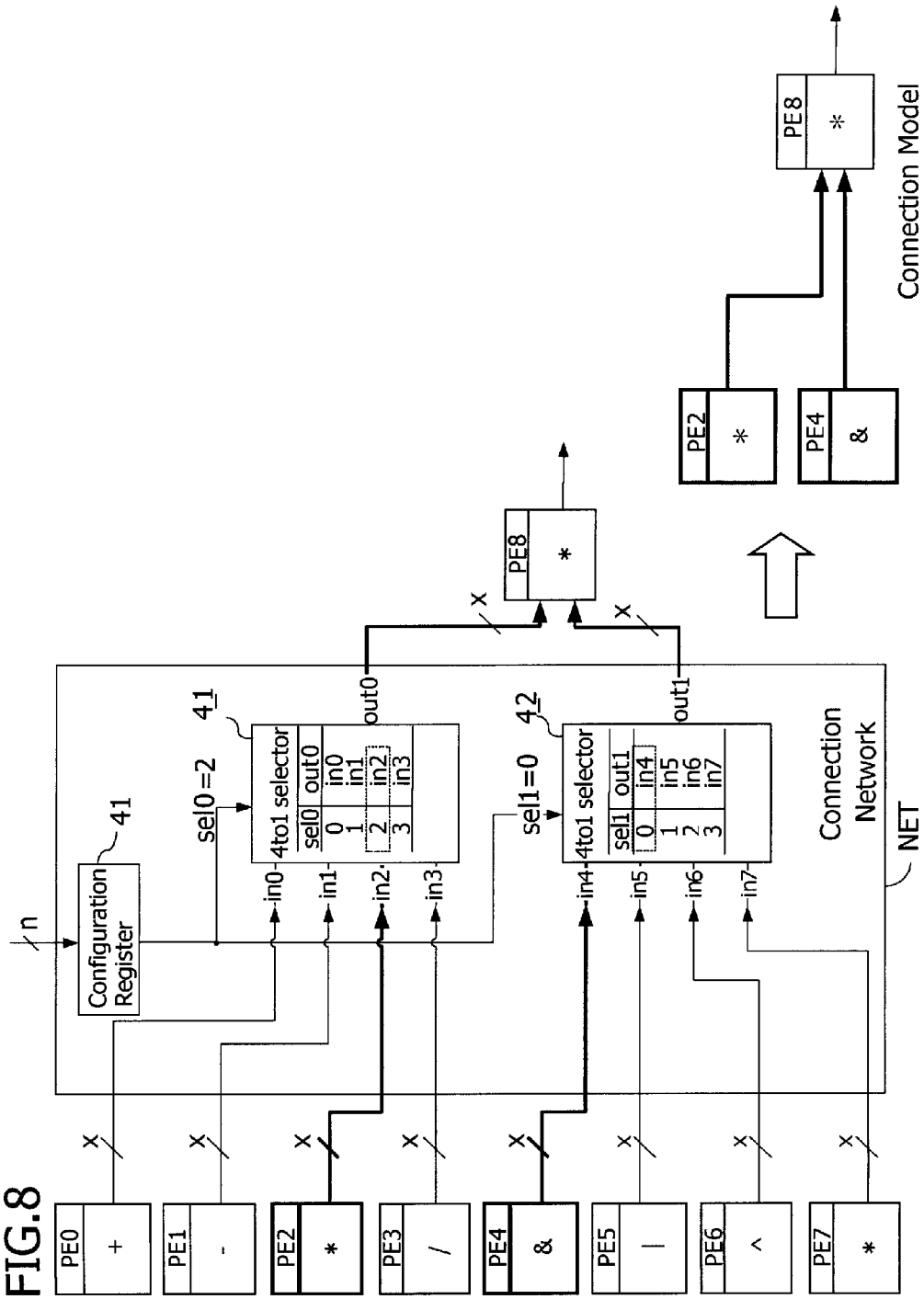
FIG. 8 is a diagram depicting an example of a connection network.

FIG. 8 is a diagram depicting an example of a connection network. On the left side in FIG. 8, eight processing elements PE0 to PE7, a network NET inter-connecting the processing elements, and one processing element PE8 are illustrated, and the network NET comprises a configuration register 41 and two selectors 4_1 and 4_2, each of which includes four inputs and one output. Each output of the four processing elements PE0 to PE3 are connected to the four inputs of the selector 4_1, and each output of the four processing elements PE4 to PE7 is connected to the four inputs of the selector 4_2. The configuration data for the selector 4_1 and 4_2 are sel0=2 and sel1=0 respectively. In other words, the selector 4_1 selects the output of the processing element PE2, and connects this output to one of the inputs of the processing element PE8, and the selector 4_2 selects the output of the processing element PE4, and connects this output to the other of the inputs of the processing element PE8.

In the case of FIG. 8, the valid input connection in the network NET are PE2 and PE4, and the valid output connection is PE8. Therefore on the right side in FIG. 8, a simplified model, extracting only valid connections (connection models), is depicted. A connection model is often used as a data flow graph which represents a flow of data to be processed.

Figure 9:
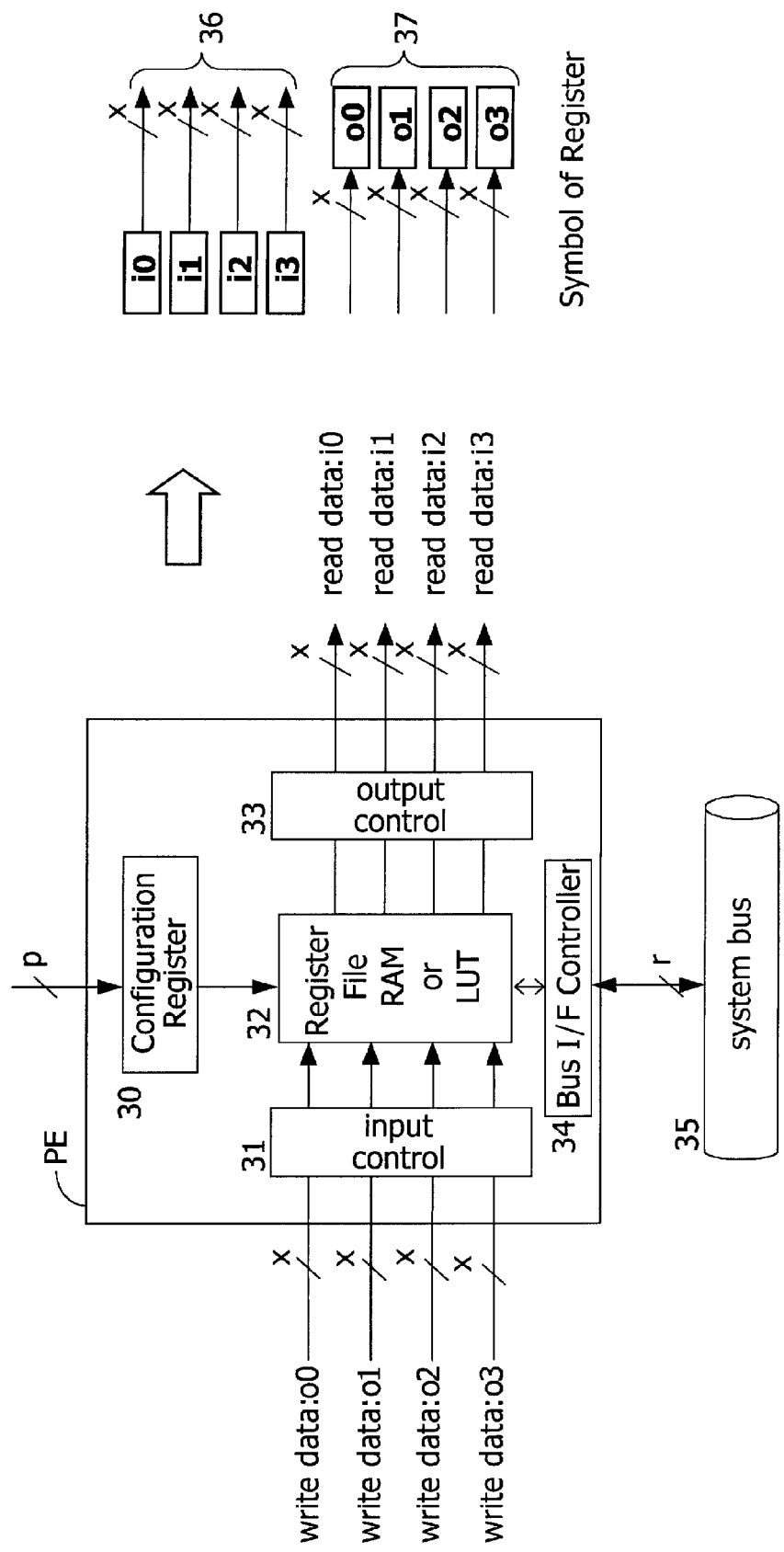
FIG. 9 is a diagram depicting a configuration of a processing element enclosing a register file and the symbols of the processing element.

FIG. 9 is a diagram depicting a configuration of a processing element enclosing a register file and the symbols of the processing element. The register file-integrated processing element PE includes a register file 32 constituted by RAM (Random Access Memory) and LUT (LookUp Table), instead of an ALU, which is an arithmetic processing circuit in FIG. 5. An input control circuit 31 inputs write data o0 to o3, and writes this data in the register file 32, and an output control circuit 33 reads data in the register file 32, and outputs the data as read data i0 to i3. The input/output control of the register file 32 and the access control based on an address are configured by the configuration data, which is supplied to the configuration register 30. The register file 32 is written or read by access from the system bus 35.

On the right side in FIG. 9, symbols of the register file-integrated processing element are depicted. 36 in FIG. 9 is a symbol which indicates a case when data in the register file 32 is output as the read data i0 to i3. In this case, the data in the register file is output as the input data signals i0 to i3 to a processing element (not illustrated), which is connected in the latter step of the output control circuit 33.

37 in FIG. 9 is a symbol indicating a case when the write data o0 to o3 is stored in the register file 32. In this case, the output data signals o0 to o3, from a processing element (not illustrated) connected in the former step of the input control circuit 31, are input. Both symbols are depicted as a data flow graph which represents a flow of data.

Figure 10:
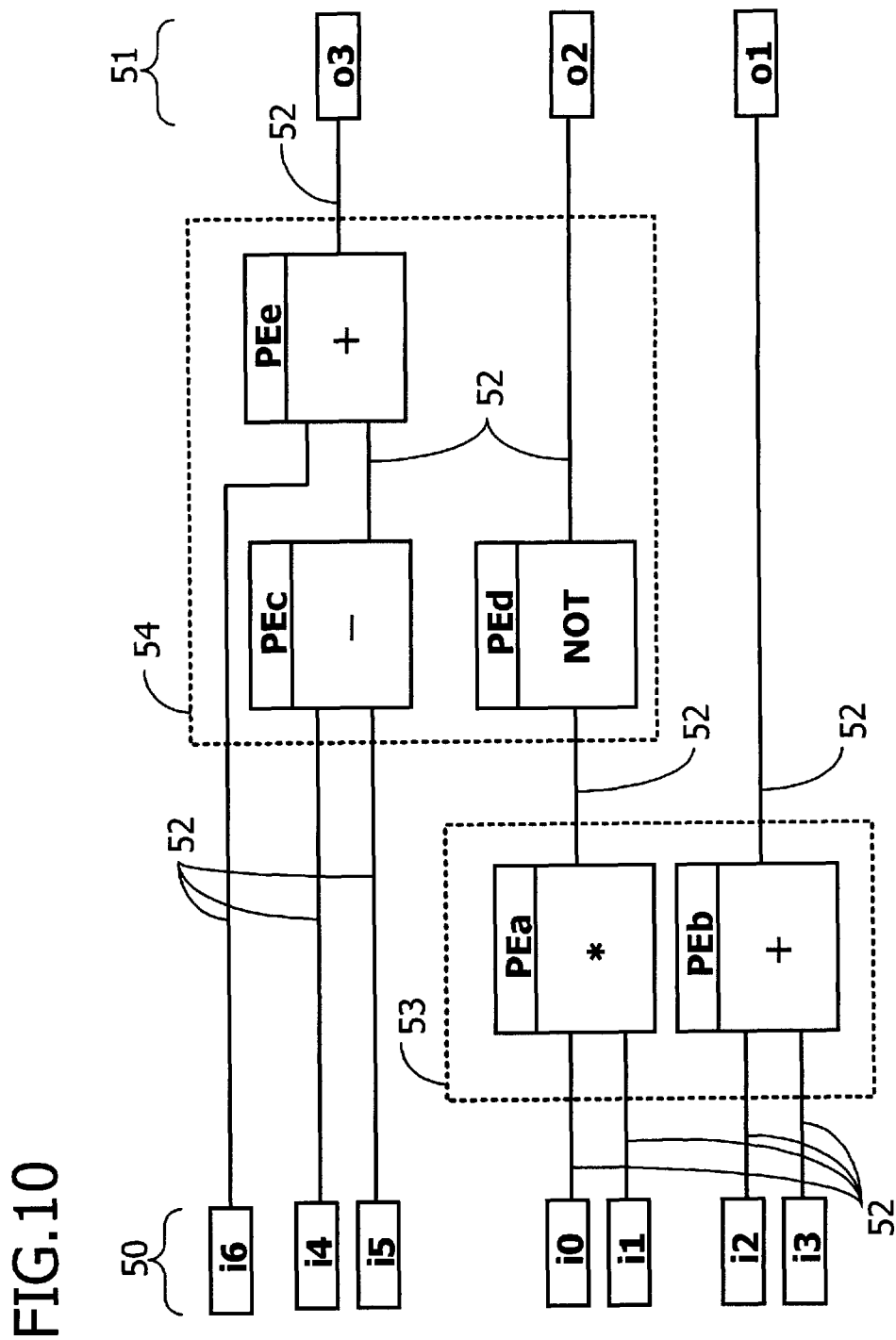
FIG. 10 is a data flow graph. Problems will now be described with reference to this data flow graph.

FIG. 10 is a data flow graph. Problems will now be described with reference to this data flow graph. According to the data flow graph in FIG. 10, a processing element PEa multiplies input data signals i0 and i1, a processing element PEd inverts this output and outputs an output data signal o2, a processing element PEb adds input data signals i2 and i3 and outputs an output data signal o1, a processing element PEc subtracts input data signals i4 and i5, and a processing element PEe adds this output and an input data signal i6, and outputs an output data signal o3.

The input data signals i0 to i5 are read by a register file-integrated processing element (not illustrated), and the output data signals o1 to o3 are written in this processing element.

Generally a circuit aiming at this kind of data flow is implemented by describing the circuit operation by a hardware description language and a schematic editor, and performing logical synthesis of the described files using a dedicated compiler for a reconfigurable LSI. The resources of the circuits required for a configuring this circuit are the register groups 50 and 51 which input/output data, five processing elements PEa to PEe, and the connection network 52 for connecting these resources.

However the circuit resources which are used by a reconfigurable LSI are limited, therefore if the circuit resources required for the data flow graph exceeds the limit of available resources, the compiler divides the entire data flow graph into units, that is into contexts, within which data is processed all at once. For example, if a maximum number of available processing elements is 3, then the data flow graph is divided into unit 53 and unit 54 enclosed by the broken lines in FIG. 10.

Figure 11:
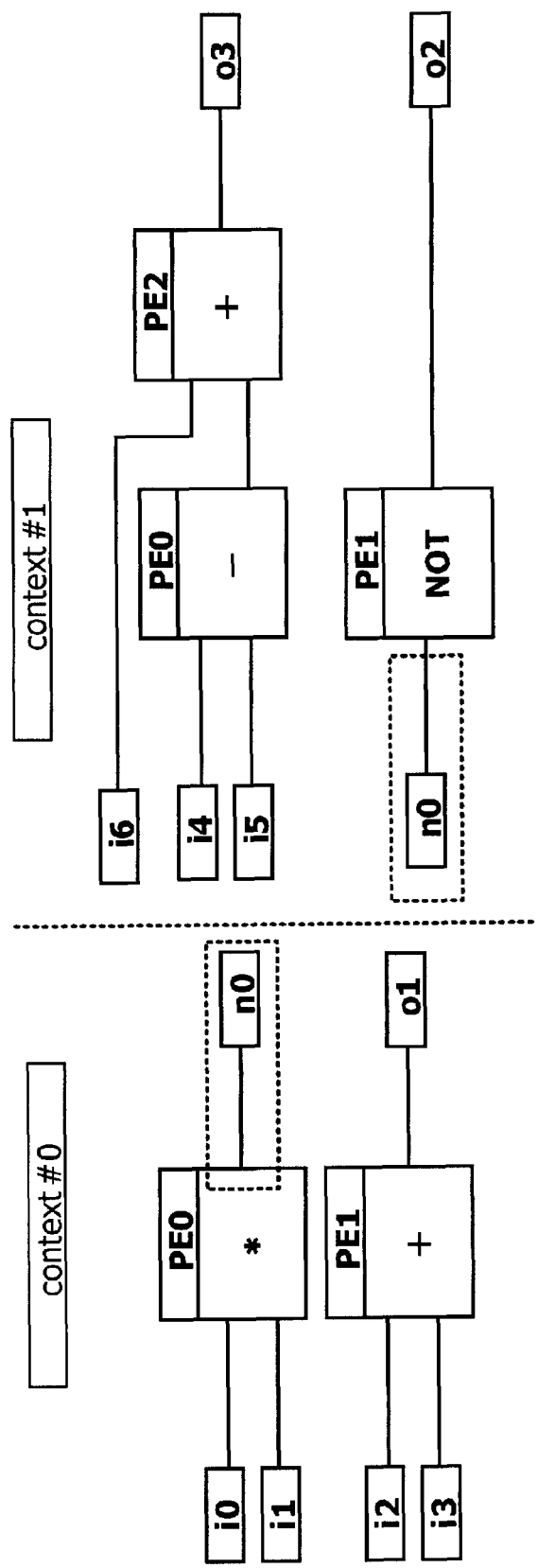
FIG. 11 is a diagram depicting an example when the data flow graph in FIG. 10 is divided into two contexts.

FIG. 11 is a diagram depicting an example when the data flow graph in FIG. 10 is divided into two contexts. In other words, in FIG. 11, the data flow graph is divided into context #0, which has PE0 and PE1 for configuring a circuit unit 53 including the processing elements PEa and PEb in FIG. 10, and context #1, which has PE0, PE1 and PE2 for configuring a circuit unit 54 including the processing elements PEc, PEd and PEe in FIG. 10.

Accordingly in context #0, the input data signals i0 to i3 are input, and the output data signals o1 and n0 are output. In context #1, on the other hand, the input data signals i4 to i6 and n0 are input, and the output data signals o2 and o3 are output. Because the data flow graph is divided into two contexts, the processing element PE0 of the context #0 writes the output data signal n0 first to the register file-integrated processing element, then the processing element PE1 of the context #1 reads this data from the register file-integrated processing element as an input data signal n0. In other words, the two contexts must transfer the data n0 via the register file-integrated processing element.

Figure 12:
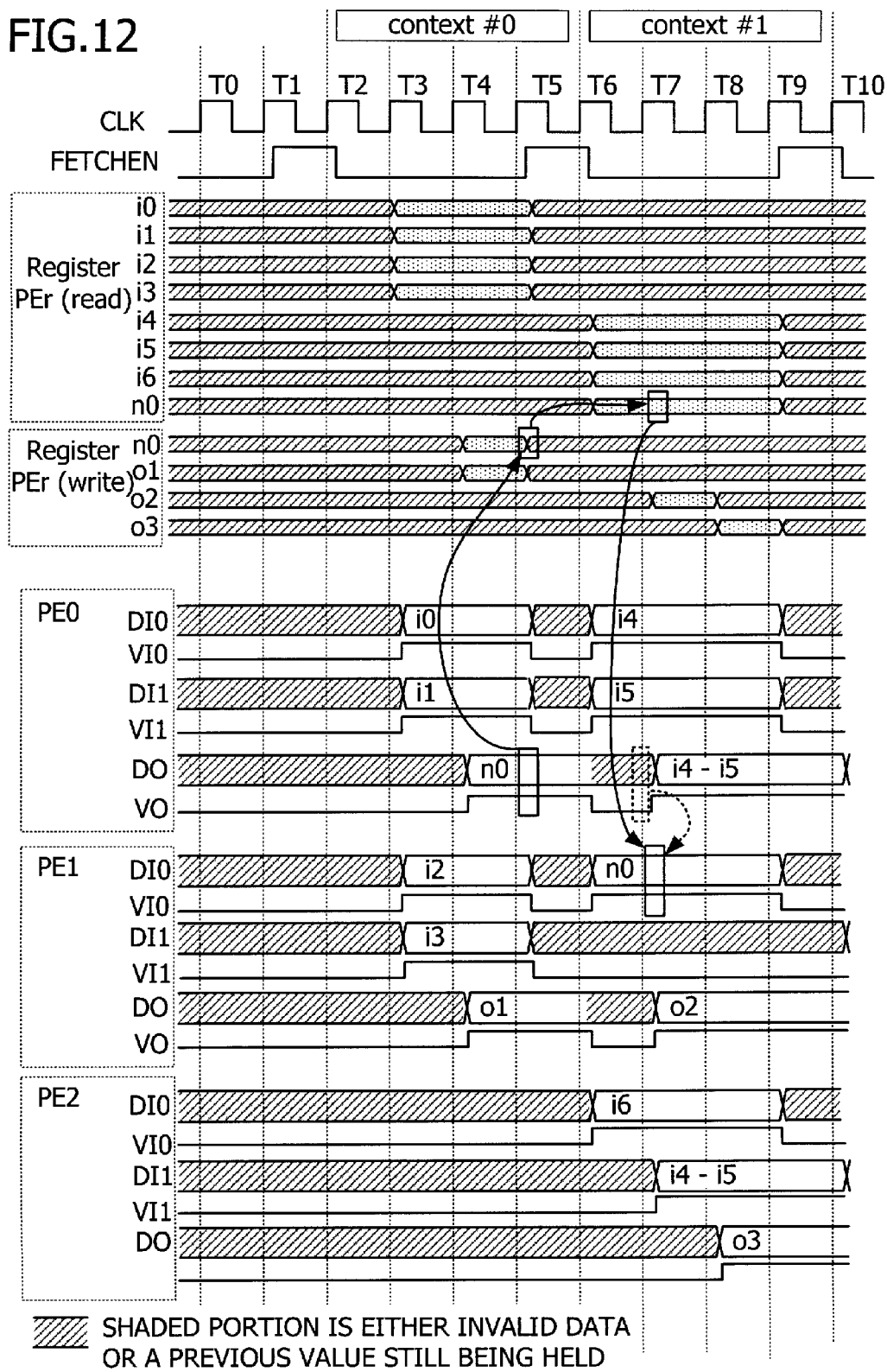
FIG. 12 is a timing chart depicting an operation in each of the circuits divided into two contexts in FIG. 11.

FIG. 12 is a timing chart depicting an operation in each of the circuits divided into two contexts in FIG. 11. FIG. 12 depicts the operation of context #0 in cycles T2 to T5, and the operation of context #1 in cycles T6 to T9. In addition to the input data signals DI0 and DI1, input valid signals VI0 and VI1, the output data signal D0 and the output valid signal V0 in the processing elements PE0, PE1 and PE2, read signals i0 to i6 and n0 and write signals n0 and o1 to o3 of the register file-integrated processing element PEr are depicted.

In context #0, each of the processing elements PE0 and PE1 computes the input data signals i0, i1, i2 and i3 which are input in cycle T3, and output the data signals n0 and o1, which is the computing result, in cycle T4. The output data signal n0 is written in the register file-integrated processing element PEr in the cycle T5.

In the subsequent context #1, in cycle T6 upon reconfiguration data update the processing element PE1 inputs the input data signal n0, which is read from the register file-integrated processing element PEr, and outputs the output data signal o2 in cycle T7, which is one cycle later, as the computing result data.

In this way, exchanging data n0 via the register file-integrated processing element PEr increases the cost of the processing element PEr and the wiring for connections thereof, and unnecessary expends hardware. Furthermore, latency for writing or reading the register file-integrated processing element PEr causes a drop in data flow performance.

[Processing Element in Embodiment]

The processing element in this embodiment is configured in the hold mode using the configuration data. The processing element configured in the hold mode latches an input data signal when the configuration is updated, even if the input valid signal indicating validity is not input, and sets the output valid signal to valid, and outputs the computed output data signal after the latency of the configured arithmetic processing circuit.

Therefore without exchanging data signals between different continuous contexts, as described in FIG. 12, the output data signal of the processing element in the former context is input by another processing element in the latter context as the input data signal. Thereby a latency problem in the writing or reading the register file-integrated processing element is avoided without unnecessarily expending hardware.

In other words, as the broken line in FIG. 12 indicates, the output data signal n0, which is still held by the processing element PE0 in cycle T6, is input and computed by the processing element PE1 in cycle T7 as the input data signal n0. Then the processing element PE1 latches the input data signal n0 in cycle T6, and holds the input data signal n0 in the input data holding register so that the processing element PE0 does not input new computing results i4 and i5 thereafter.

Figure 13:
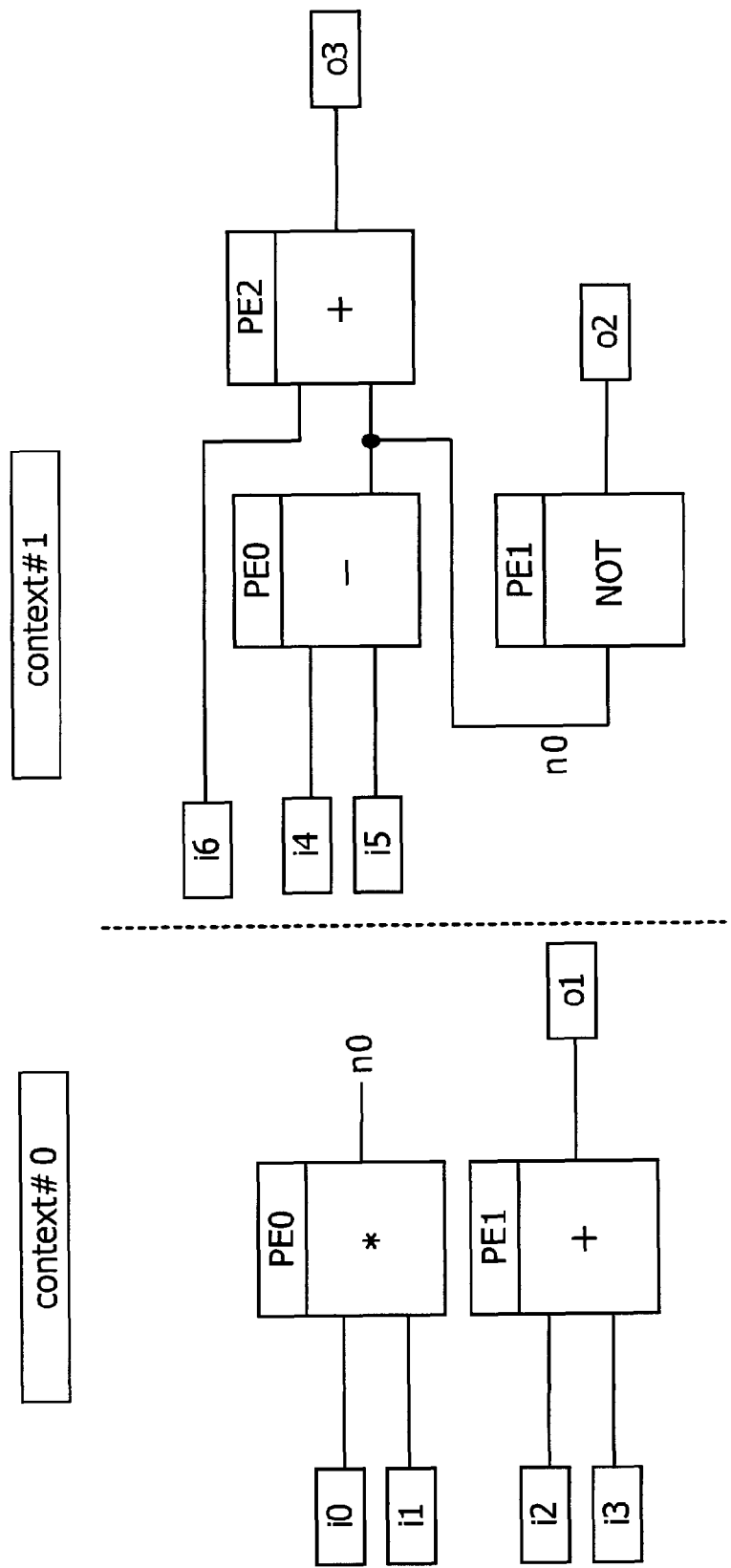
FIG. 13 is a diagram depicting an example when the data flow graph in FIG. 10 is divided into two contexts according to this embodiment.

FIG. 13 is a diagram depicting an example when the data flow graph in FIG. 10 is divided into two contexts according to this embodiment. Just like FIG. 11, the data flow graph is divided into a context #0 which has PE0 and PE1 for configuring a circuit unit 53 including the processing elements PEa and PEb in FIG. 10, and a context #1 which has PE0, PE1 and PE2 for configuring a circuit unit 54 including the processing elements PEc, PEd and PEe in FIG. 10. In the context #0, the input data signals i0 to i3 are input, and the output signal o1 is output. In the context #1, on the other hand, the input signals i4 to i6 are input, and the output data signals o2 and o3 are output. However unlike FIG. 11, when updating to context #1, processing element PE1 of the context #1 inputs the output data n0 which the processing element PE0 outputs and holds in the context #0. Therefore in the context #1, the processing element PE1 is configured in the hold mode. The other processing elements PE0 and PE2 are not configured in the hold mode.

Figure 14:
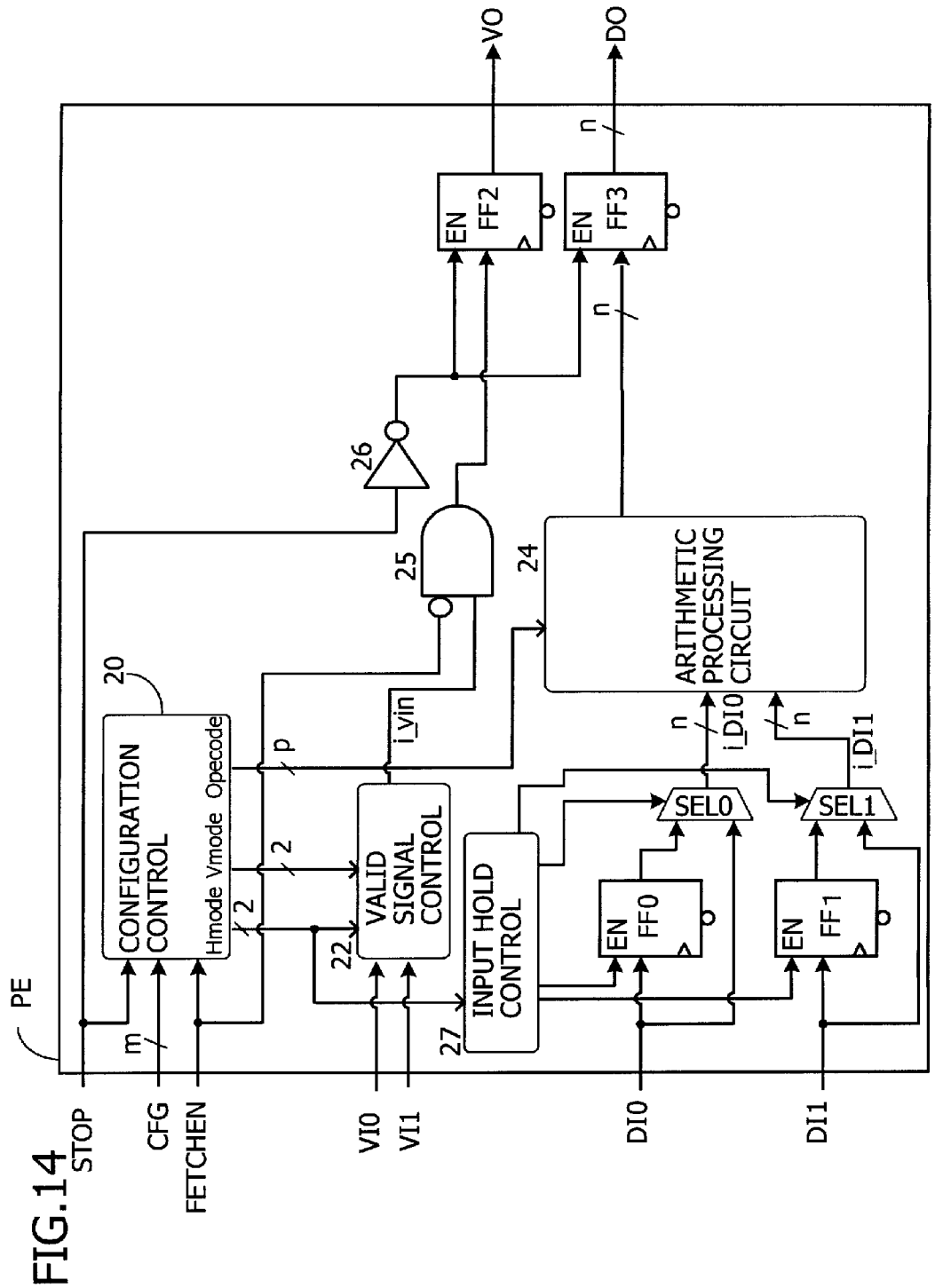
FIG. 14 is a block diagram of a processing element according to this embodiment.

FIG. 14 is a block diagram of a processing element according to this embodiment. This processing element PE is configured in the hold mode if the configuration data to make the hold mode valid is supplied. Just like PE in FIG. 2, the processing element PE in FIG. 14 comprises a configuration control circuit 20, a valid signal control circuit 22, an arithmetic processing circuit 24, an output valid signal holding register FF2 which holds an output valid signal, and an output data signal holding register FF3. This processing element PE includes a hold mode signal in the configuration data, and the configuration control circuit 20 outputs the hold mode signal Hmode responding to the configuration data to make the hold mode valid. The processing element PE further comprises input data holding registers FF0 and FF1 which hold the input data signal DI0 and DI1, selectors SEL0 and SEL1 which select the internal input data signals i_DI0 and i_DI1 to be input in the arithmetic processing circuit 24, an input hold control circuit 27, an output data holding register FF3, a circuit 25 for generating the output valid signal, and an output valid signal holding register FF2 for the output valid signals generated by the circuit 25.

Figure 15:
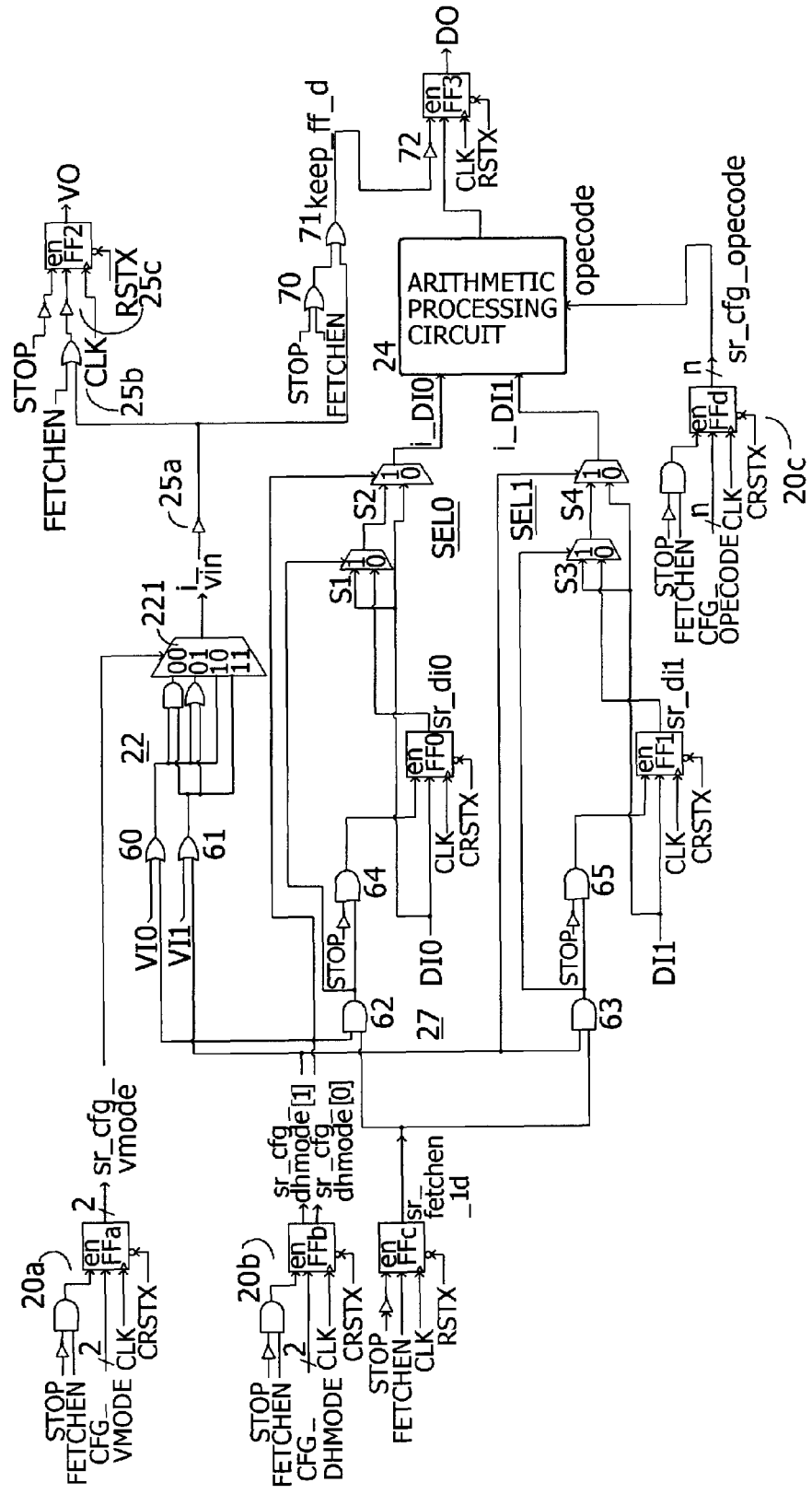
FIG. 15 is a detailed block diagram of the processing element in FIG. 14.

FIG. 15 is a detailed block diagram of the processing element in FIG. 14. In FIG. 15, the configuration control circuit 20 includes three circuits: 20a, 20b and 20c. The first configuration control circuit 20a includes a register FFa, which is a flip-flop and latches a valid mode signal CFG_VMODE at the rise edge of the clock CLK when the fetch enable signal FETCHEN is in H level. The second configuration control circuit 20b includes a register FFb which latches the hold mode signal CFG_DHMODE at the rise of the clock CLK when the fetch enable signal FETCHEN is in H level. And the third configuration control circuit 20c includes a register FFd which latches an operation code CFG_OPECODE at the rise of the clock CLK when the fetch enable signal FETCHEN is in H level. These registers FFa, FFb and FFd correspond to a number of bits of a signal to latch, and are reset when the configuration reset signal CRSTX is in L level. The latched configuration signals are distributed internally respectively.

The input hold control circuit 27 includes: a flip-flop FFc which latches the fetch enable signal FETCHEN responding to the clock CLK, and delays the fetch enable signal by one clock cycle to generate a delay fetch enable signal sr_fetchen_1d; and AND gates 62 and 63 and AND gates 64 and 65 for inputting the hold mode signal sr_cfg_dhmode and delay fetch enable signal sr_fetchen_1d. Thereby the enable signal for the input data holding registers FF0 and FF1 and a selection signal for the selectors SEL0 and SEL1 are generated.

The selectors SEL0 and SEL1 include selector circuits S1 and S2 and selector circuits S3 and S4 respectively. The selector circuits S2 and S4 select an input signal according to the hold mode "1" and the non-hold mode "0", and the selector circuits S1 and S3 switch an input signal in the hold mode.

If the hold mode signal sr_cfg_dhmode becomes L level (non-hold mode), the selector circuits S2 and S4 select "0", and input the input data signals DI0 and DI1 to the arithmetic processing circuit 24. If the hold mode signal sr_cfg_dhmode becomes H level (hold mode), on the other hand, the selector circuits S2 and S4 select "1", and input the output of the selector circuits S1 and S3 to the arithmetic processing circuit 24. The selector circuits S1 and S3 select either the input data signals DI0 and DI1 or the outputs of the input data holding registers FF0 and FF1, depending on whether the outputs of the AND gates 62 and 63 are "1" or "0". If the hold mode signal sr_cfg_dhmode is in H level, the outputs of the AND gates 62 and 63 become L level if the output of the flip-flop FFc is L level upon updating the configuration, or become H level if the output of the flip-flop FFc, which is generated after a one clock delay from the update. In other words, when the mode is updated to the hold mode, the selector circuits S1 and S2 select the input data signals DI0 and DI1 in the clock cycle upon the update, and select the input data signals held in the input data holding registers FF0 and FF1 in the subsequent clock cycles after the update.

The valid signal control circuit 22 further comprises OR gates 60 and 61 for generating the OR of the input valid signals VI0 and VI1 and the hold mode signal sr_cfg_dhmode [1:0], in addition to the above mentioned selector circuit 221. In other words, in the case of the non-hold mode, the valid signal control circuit 22 sets the internal valid signal i_vin to H level when the input valid signals VI0 and VI1 are in H level, and in the case of the hold mode, [the valid signal control circuit 22] sets the internal valid signal i_vin to H level not only when the input valid signals VI0 and VI1 are in H level, but also when the hold mode signal sr_cfg_dhmode [1:0] is in H level.

The output valid signal generation circuit 25 includes an inverter 25a which inverts the internal valid signal i_vin, an OR gate 25b which determines the OR of the inverted internal valid signal i_vin and the fetch enable signal FETCHEN, and an inverter 25c which inverts the output of the OR gate 25b. Thereby if the fetch enable signal FETCHEN becomes H level, the output valid signal generation circuit 25 sets the external valid signal V0 to L level (invalid) synchronizing with the clock CLK, and while the fetch enable signal FETCHEN is in L level, the output valid signal generation circuit 25 sets the external valid signal V0 to H level (valid) synchronizing with the clock CLK if the internal valid signal i_vin becomes H level. The flip-flop FF2 in the final step of the output valid signal generation circuit 25 has latency that is one cycle of the clock CLK, and this corresponds to the latency of arithmetic processing of the computing processing circuit 24, which is "1". Therefore this flip-flop FF2 is configured to have a latency which is the same as the latency of the arithmetic processing circuit 24 according to the configuration data.

The OR gates 70 and 71 and the inverter 72 constitute a circuit for generating the enable signal of the output data holding register FF3. If the fetch enable signal FETCHEN is in H level, this circuit sets the enable signal of FF3 to L level so as to disable the latch operation of the output data holding register FF3, and if the input valid signals VI0 and VI1 become H level, the internal valid signal i_vin becomes H level, and sets the enable signal of FF3 to the H level so as to enable the latch operation of FF3, and if the hold mode signal sr_cfg_dhmode becomes H level as well, the internal valid signal i_vin becomes H level, and sets the enable signal of FF3 to H level so as to enable the latch operation of FF3.

Figure 16:
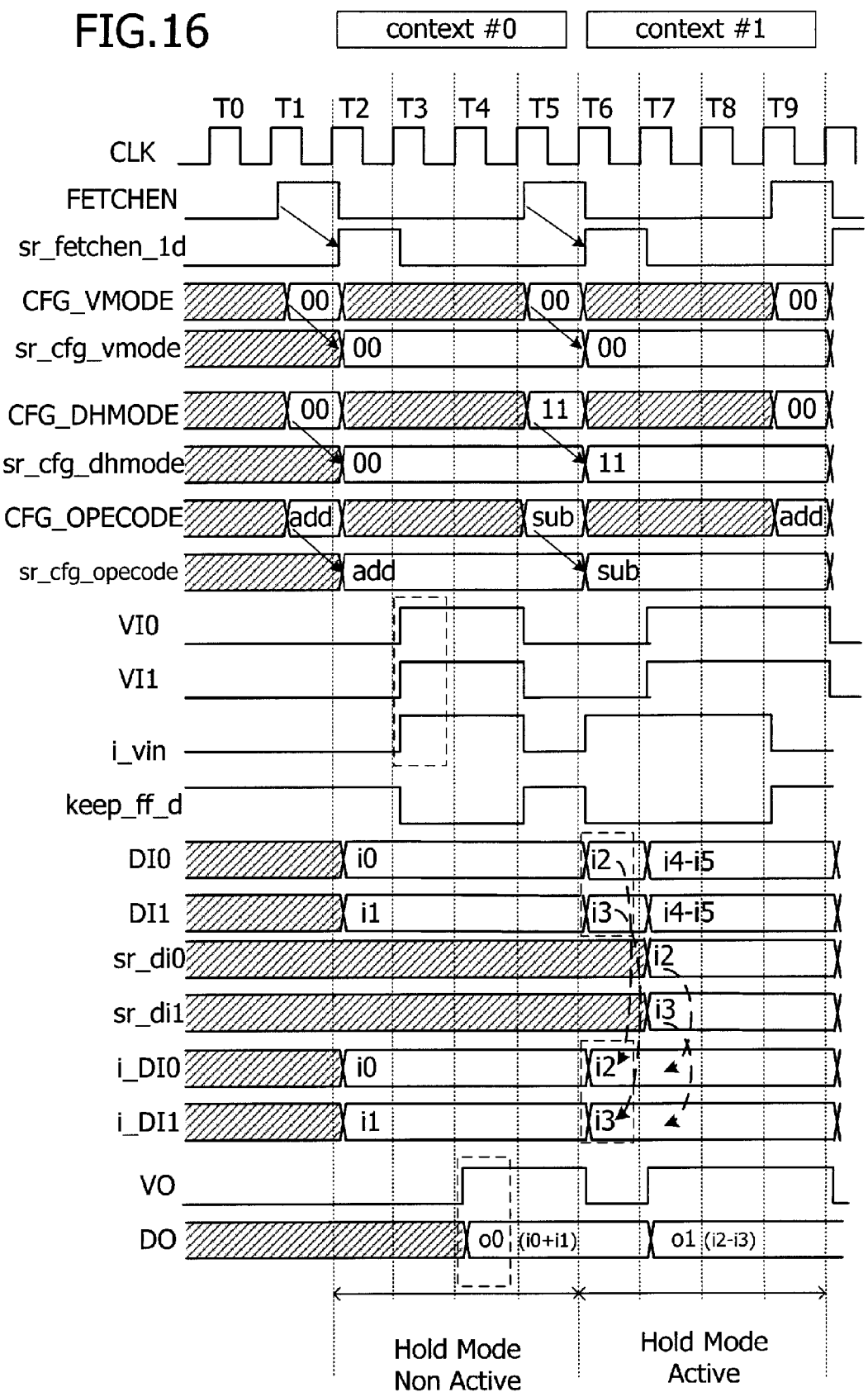
FIG. 16 is a timing chart depicting an operation example of the processing elements in FIG. 15.

FIG. 16 is a timing chart depicting an operation example of the processing elements in FIG. 15. In FIG. 16, just like FIG. 12, the fetch enable signal FETCHEN becomes H level in the clock cycle T1, the configuration is updated in T2, and the processing elements are configured to be the context #0 in cycles T2 to T5. In the same way, the fetch enable signal FETCHEN becomes H level in cycle T5, the configuration is updated in T6, and the processing elements are configured to be the context #1 in cycles T6 to T9.

According to the example in FIG. 16, in the context #0, the valid mode CFG_VMODE becomes "00", the hold mode CFG_VMODE becomes "00", and the operation code CFG_OPECODE becomes "add (addition)", and in the context #1, the valid mode CFG_VMODE becomes "00", the hold mode CFG_VMODE becomes "11", and the operation code CFG_OPECODE becomes "sub (subtraction)". In other words, the processing elements are configured in the non-hold mode in the context #0, and in the hold mode in the context #1.

The case of the non-hold mode in the context #0 will be described first. In cycle T1, the fetch enable signal FETCHEN becomes H level, then at the rise edge of the clock CLK in the subsequent cycle T2, the flip-flops FFa, FFb and FFd latch each configuration data, and internal circuits are configured based on the latched configuration data. As mentioned above, the hold mode CFG_DHMODE is "00", hence the internal hold mode signals sr_cfg_dhmode [1:0] both become L level, the selector circuits S2 and S4 of the selectors SEL0 and SEL1 both select "0", and the input data signals DI0 and DI1 become the input signals i-DI0 and i_DI1 of the arithmetic processing circuit 24.

If the input valid signals VI0 and VI1 become H level in cycle T3, the valid signal control circuit 22 sets the internal valid signal i_vin to the H level. Thereby the output data holding register FF3 enters the enable state. The output valid holding register FF2 is in the enable state since the stop signal STOP is in L level.

The arithmetic processing circuit 24 performs subtraction processing for the input data signals i0 and i1, which are the input signals i_DI0 and i_DI1 in the latency 1, outputs the computing result data, and the output data holding register FF3 outputs the output data o0 (i0+i1) in the cycle T4. In the same way, the flip-flop FF2 in the final step of the output valid signal generation circuit 25 sets the output valid signal V0 to H level, synchronizing with the output of the output data signal o0 (i0+i1), in cycle T4, which is the latency 1 after cycle T3, in which the input valid signals VI0 and VI1 become H level.

Thus in the non-hold mode, the arithmetic processing circuit 24 always inputs the input data signals DI0 and DI1, and the input valid signals VI0 and VI1 set the output valid signal V0 to H level synchronizing with the output of the output data signal o0 (i0+i1) corresponding to the input data signals i0 and i1 in the H level. As a result, substantially only the valid input data signals are processed, and only the valid output data signals corresponding to the valid input data signals are output as valid signals. A number of steps of the logic circuits is decreased by separating the logic for processing from the logic for determining valid or invalid.

Now the case of the hold mode in the context #1 will be described. In the processing element PE1 which is configured in the hold mode, the input data holding registers FF0 and FF1 hold the input data signals i2 and i3 upon updating (cycle T6) at the rise edge of the clock CLK in cycle T7, regardless whether the input valid signals VI0 and VI1 are valid or invalid, and the arithmetic processing circuit 24 performs computing processing for the input data signals i2 and i3, which are held in the input data holding register. In the case of the example in FIG. 15, the selector circuits S1 and S3 are disposed so as to input the input data signals i2 and i3 upon updating (cycle T6) into the arithmetic processing circuit 24 at the timing in cycle T6.

First the input data holding registers FF0 and FF1 and the selectors SEL0 and SEL1 will be described. In cycle T5, the fetch enable signal FETCHEN becomes H level, and at the rise of the clock CLK in the subsequent cycle T6, the flip-flops FFa, FFb and FFd latch each configuration data, and internal circuits are configured based on the latched configuration data. This time the hold mode CFG_DH-MODE is "11", therefore the internal hold mode signals sr_cfg_dhmode [1:0] both become H level, and the selector circuits S2 and S4 of the selectors SEL0 and SEL1 both select "1".

In cycle T6, the flip-flop FFc latches H level of the fetch enable signal FETCHEN in cycle T5 at the rise edge of the clock CLK, and sets the delay fetch enable signal sr_fetchen_1d, which is delayed by one clock, to H level. As a result, the outputs of the AND gates 62 and 63 become H level only in the cycle T6, the selector circuits S1 and S3 select "1", and output the input data signals i2 and i3 as the input signals i_DI0 and i_DI1 of the arithmetic processing circuit 24. Thereby the arithmetic processing circuit 24 starts subtraction processing for the input data signals i2 and i3 in cycle T6.

At the same time, the outputs of the AND gates 64 and 65 also become H level only in cycle T6, therefore the input data holding registers FF0 and FF1 become enabled state, and latch the input data signals i2 and i3 in cycle T6, responding to the rise edge of the clock CLK in the subsequent cycle T7.

In the subsequent cycle T7 and later, the delay fetch enable signal sr_fetchen_1d becomes L level, therefore the outputs of AND gates 62 to 65 become L level, the selector circuits S1 and S3 select "0", and the input data signals i2 and i3, held by the input data holding registers FF0 and FF1, are input to the arithmetic processing circuit 24. In cycle T7 and later, the enable signals of the input data holding registers FF0 and FF1 become L level, and the new input data signals i4 and i5 are not held by the input data holding registers FF0 and FF1.

Thus the processing element configured to be in the data hold mode starts processing by directly inputting the input data signals DI0 and DI1 (i2, i3) upon updating the configuration data in T6 into the arithmetic processing circuit 24, and in T7, which is immediately after the update, the input data holding registers FF0 and FF1 latch the input data signals DI0 and DI1 (i2, i3), and output the input data signals, which have been held since T7, to the arithmetic processing circuit 24.

Operation in the valid signal side is as follows. First the H level of the fetch enable signal FETCHEN is inverted in the cycle T5, and the inverted fetch enable signal FETCHEN is latched by the output valid holding register FF2 in cycle T6, and the output valid signal V0 becomes L level only in cycle T6. On the other hand, the internal valid signal i_vin becomes H level regardless whether the input valid signals VI0 and VI1 are valid or invalid, because H level of the internal hold mode signal sr_cfg_dhmode [1:0] is latched at the rise edge of the clock CLK in cycle T6. Thereby the input data signals DI0 and DI1 (i2, i3) in cycle T6 are handled as substantially valid input data signals.

Because of H level of the fetch enable signal FETCHEN in cycle T5, the output signal keep_ff d of the OR gate 71 becomes H level, and the output data holding register FF3 becomes disabled state only in cycle T5, but becomes enabled state in cycle T6 and later because of H level of the internal valid signal i_vin.

The arithmetic processing circuit 24 outputs the computing result data in cycle T7 after the latency 1 from the cycle T6, and the output data holding register FF3 outputs the output data signal o1 (i2 and i3). Synchronizing with this output, the output valid signal generation circuit 25 and the output valid holding register FF2 set the output valid signal V0 to H level. Thereby the circuit in the subsequent step, that is connected to the processing element, inputs the output data signal o1 (i2 and i3) as a valid signal.

Figure 17:
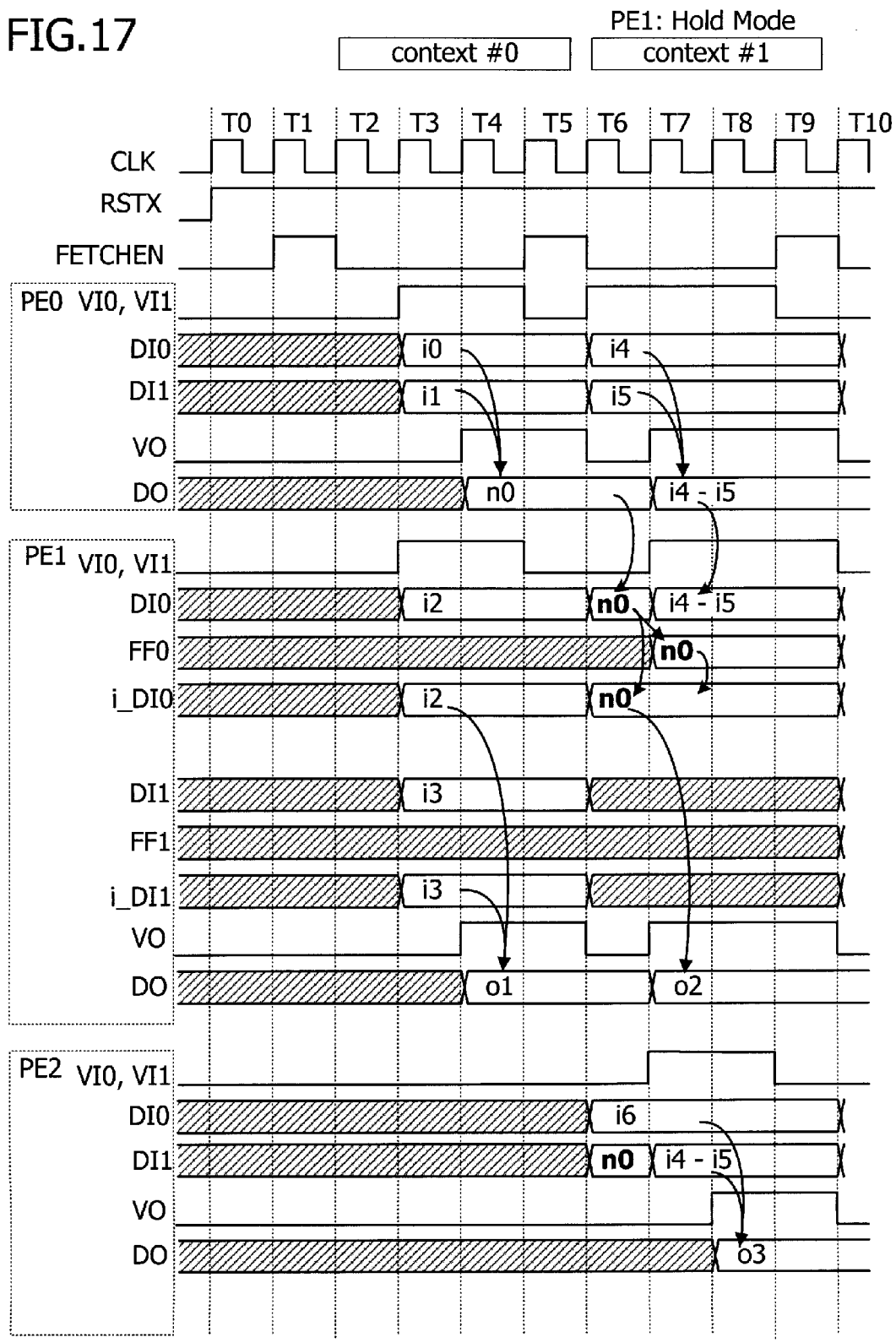
FIG. 17 is a timing chart depicting an operation when the hold mode of the processing element according to this embodiment is used for the contexts #0 and #1 in FIG. 13.

FIG. 17 is a timing chart depicting an operation when the hold mode of the processing element according to this embodiment is used for the contexts #0 and #1 in FIG. 13. In FIG. 13, upon updating to the context #1, the output data signal n0 generated by the processing element PE0 in the context #0 is input and held by the processing element PE1. Then in the context #1, at least the processing element PE2 is configured in the non-hold mode, and the processing element PE0 inputs the newly generated output data signal in the context #1.

In FIG. 17, in each processing element, the configuration data is latched in the clock cycle T2 because of H level of the fetch enable signal FETCHEN in clock cycle T1, and the internal circuit of the context #0 is configured. In other words, as FIG. 13 illustrates, the processing element PE0 is configured to be a circuit where the input data signals i0 and i1 are input and multiplied, and the output data signal n0, which is the multiplied value, is output, and the processing element PE1 is configured to be a circuit where the input data signals i2 and i3 are input and added, and the output data signal o1, which is the added value, is output. Both the processing elements PE0 and PE1 are configured in the non-hold mode.

Therefore in FIG. 17, the processing element PE0 multiplies the input data signals i0 and i1, which are input along with the input valid signals VI0 and VI1 in H level in cycle T3, and outputs the output data signal D0 (n0) thereof in cycle T4 after the latency 1, along with the output valid signal V0, which is in H level. This output data signal n0 is not written in the register file-integrated processing element.

The processing element PE1, in the same way, adds the input data signals i2 and i3 which are input along with the input valid signals VI0 and VI1 in the H level in cycle T3, and outputs the output data signal DO (o1) thereof in cycle T4 after the latency 1, along with the output valid signal V0 which is in H level. In this case, the input data signals are not held in the input data holding registers FF0 and FF1, since the processing element PE1 is in the non-hold mode. The input data signals DI0 and DI1 are continuously input to the arithmetic processing circuit 24 after the context #1 is updated to the context #0.

Then because of H level of the fetch enable signal FETCHEN in cycle T5, the configuration data is latched in cycle T6, and the internal circuit of the context #1 is configured. In other words, as FIG. 13 illustrates, the processing element PE0 is configured so that the input data signals i4 and i5 are input and subtracted, and the subtracted result is output as the output data signal, and the processing element PE2 is configured so that the input data signal i6 and the output data signal of the processing element PE0 are input and added, and the added result is output as the output data signal o3. These processing elements PE0 and PE1 are configured in the non-hold mode. The output terminal of the processing element PE0 is configured so as to be connected to the input terminal of the processing element PE1, and the processing element PE1 is configured so as to invert the input data signal n0 and output the output data signal o2. The processing element PE1 is configured to be in the hold mode.

In cycle T6, a new configuration data is latched and is set inside, whereby the context #0 is updated to the context #1. In cycle T6, when the configuration is updated, the output valid signal V0 in each processing element becomes L level, and the processing element PE0 still holds the output data signal n0 generated in the context #0 in the output data holding register FF3.

Then the processing element PE1 inputs the data signal n0, which is input as the input data signal DI0 in the cycle T6 when the configuration is updated, into the arithmetic processing circuit 24. The arithmetic processing circuit 24 starts inversion in cycle T6. Then at the rise edge of the clock CLK in the subsequent cycle T7, the input data holding register FF0 latches the input data signal n0 which was input in cycle T6, and inputs the input data signal n0 to the arithmetic processing circuit 24. The latched input data signal n0 is continuously input to the arithmetic processing circuit 24 thereafter. Then the computing result signal for the input data signal n0 in cycle T6 is output in cycle T7 after the latency 1, as the output data signal o2. In other words, the output valid signal V0 becomes H level in cycle T7, although the input valid signals VI0 and VI1 are not in H level (valid) in cycle T6. This is because the output valid signal V0 is set to H level by the hold mode signal, as described in FIG. 15 and FIG. 16. As a result, the processing element PE1 outputs a valid output data signal o2 in cycle T7.

In the processing element PE1, the output data signals i4 and i5 of the processing element PE0 is input to the input data signal DI0 in cycle T7, but the output data signals i4 and i5 of the processing element PE0 is not latched inside since the input data holding register FF0 keeps holding the input data signal n0.

In the processing element PE2 as well, the output data signal n0 of the processing element PE0 is input in cycle T6, but the computing result of the output data signal n0 is not output along with the output valid signal V0 which is valid (H level), since the mode is a non-hold mode.

[Variant Form of this Embodiment]

As a variant form of the processing element in FIG. 15, the input data signals upon updating the configuration may be held by the input data holding registers FF0 and FF1 and be input to the arithmetic processing circuit 24 via the selector circuits S2 and S4 without disposing the selector circuits S1 and S3 of the selectors SEL0 and SEL1. In this case, the start of the computing by the arithmetic processing circuit 24 delays by one clock cycle.

Since the start of the computing processing delays by one cycle, the output valid signal V0 in H level generated based on the hold mode signal in H level is also delayed by one cycle. To implement this, a flip-flop for delaying one clock cycle is inserted in the latter step of the OR gates 60 and 61 in the configuration of FIG. 15.

Figure 18:
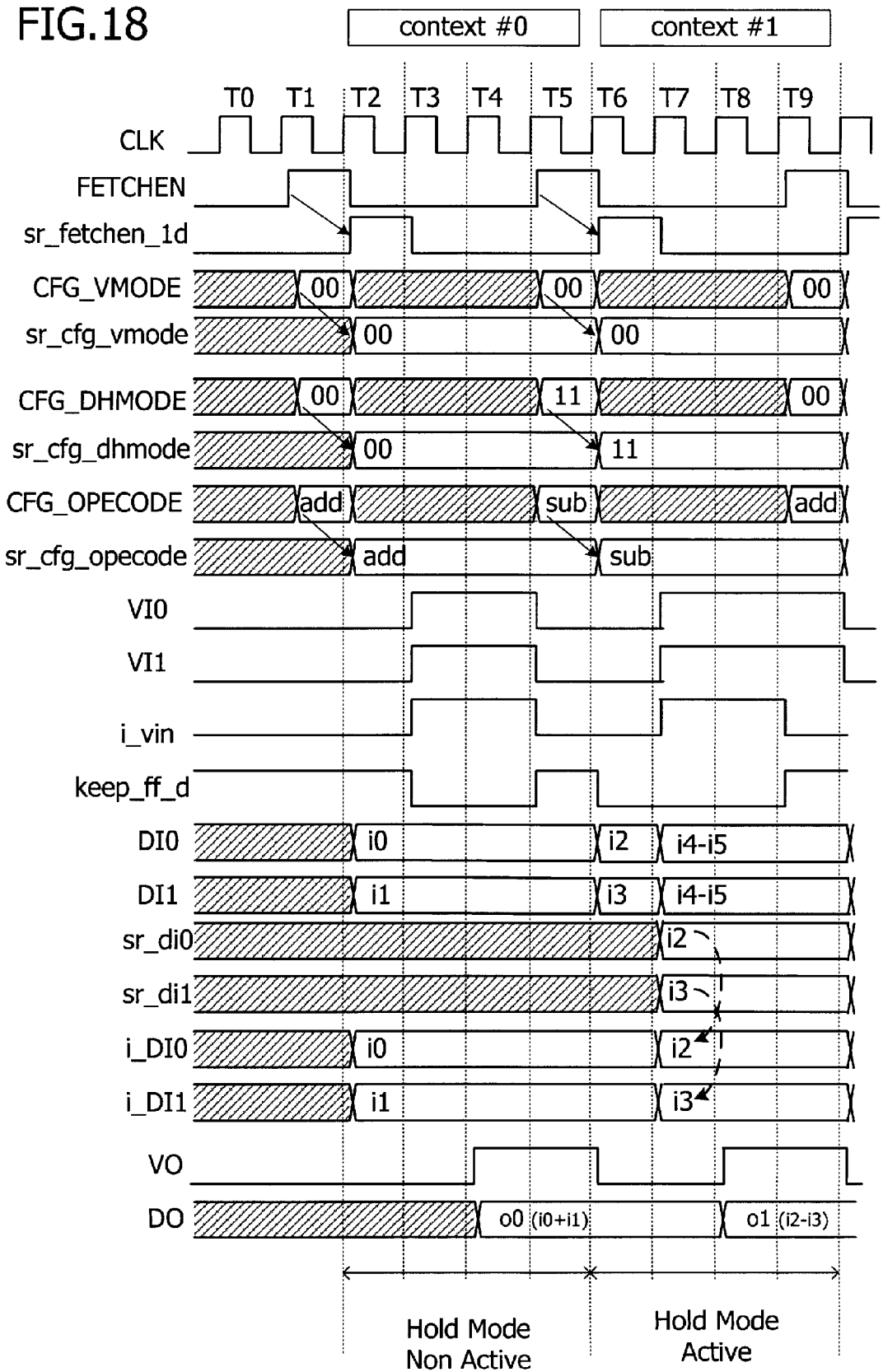
FIG. 18 is a timing chart depicting an operation according to the variant form of this embodiment.

FIG. 18 is a timing chart depicting an operation according to the variant form of this embodiment. FIG. 18 corresponds to FIG. 16. In FIG. 18, unlike FIG. 16, signals i2 and i3 of the input data signals DI0 and DI1 are not input to the arithmetic processing circuit 24 as the input signals i_DI0 and i_DI1 in cycle T6. The signal i2 and i3 of the input data signals DI0 and DI1 in cycle T6 are held by the input data holding registers FF0 and FF1 at the rise edge of the clock CLK in the subsequent cycle T7, and are input to the arithmetic processing circuit 24 as the input signals I_DI0 and i_DI1.

Furthermore in FIG. 18, unlike FIG. 16, the output data signal o1 (i2 and i3) of the computing result is output along with the output valid signal in H level in cycle T8.

As described above, according to this embodiment, the configuration of the hold mode is added to the processing elements, and a processing element in the hold mode configuration in the subsequent context transfers data between the continuous contexts upon updating the configuration. Therefore the data between the contexts need not be transferred via the register file-integrated processing element, and unnecessary expending and latency of hardware are eliminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

The invention claimed is:

1. A reconfigurable integrated circuit device, which is configured by configuration data comprising:
a plurality of processing elements each of which includes an arithmetic circuit, and which are configured by the configuration data; and
an inter-processing element network which connects the plurality of processing elements in a state configured by the configuration data, wherein
the processing element inputs an input valid signal and an input data signal, and outputs an output valid signal and an output data signal, the processing element includes an input data holding register which holds the input data signal, an arithmetic processing circuit which computes the input data signal, and an output data holding register which holds computing result data of the arithmetic processing circuit,
when updating from a first context which includes a circuit configured by a first configuration data to a second context which follows the first context and includes a circuit configured by a second configuration data, a second processing element which is included in the second context and is configured in a hold mode holds, in the input data holding register, as the input data signal, an output data signal held by an output data holding register of a first processing element which is included in the first context,
when the configuration of the processing element is updated by configuration data that makes the hold mode valid, the processing element inputs the input data signal held in the input data holding register to the arithmetic processing circuit, and
when the configuration of the processing element is updated by configuration data that makes the hold mode invalid, the processing element continuously inputs the input data signal, which is to be input, to the arithmetic processing circuit without using the input data holding register.

2. The reconfigurable integrated circuit device according to claim 1, wherein
the processing element inputs the configuration data in response to a fetch enable signal to update the configuration, and
the processing element makes the output valid signal invalid, and disables latching of an output data signal by the output data holding register upon the update, in response to the fetch enable signal, regardless whether the mode is the hold mode or not.

3. The reconfigurable integrated circuit device according to claim 1, wherein
upon update to the second context, a first output data signal held by the output data holding register of the first processing element is input by the second processing element, so that the arithmetic processing circuit starts computing processing, and the first output data signal upon the update is held in the input data holding register as an input data signal, and the input data signal held in the input data holding register is input in the arithmetic processing circuit.

4. A reconfigurable integrated circuit device, which is configured by configuration data comprising:
a plurality of processing elements each of which includes an arithmetic circuit, and which are configured by the configuration data; and
an inter-processing element network which connects the plurality of processing elements in a state configured by the configuration data, wherein
the processing element inputs an input valid signal and an input data signal, and outputs an output valid signal and an output data signal, the processing element includes an input data holding register which holds the input data signal, an arithmetic processing circuit which computes the input data signal, and an output data holding register which holds computing result data of the arithmetic processing circuit,
when updating from a first context which includes a circuit configured by a first configuration data to a second context which follows the first context and includes a circuit configured by a second configuration data, a second processing element which is included in the second context and is configured in a hold mode holds, in the input data holding register, as the input data signal, an output data signal held by an output data holding register of a first processing element which is included in the first context, and
in the second context, an output terminal of the first processing element is connected to an input terminal of the second processing element, and is also connected to an input terminal of a third processing element configured by configuration data which makes the hold mode invalid.

5. A reconfigurable integrated circuit device, which is configured by configuration data, comprising:

a plurality of processing elements each of which includes an arithmetic circuit and which are configured by the configuration data; and an inter-processing element network which connects the plurality of processing elements in a state configured by the configuration data, wherein the processing element inputs an input valid signal and an input data signal, outputs an output valid signal and an output data signal, the processing element includes an arithmetic processing circuit which computes the input data signal, an output data holding register which holds the computing result data of the arithmetic processing circuit, and an output valid signal generation circuit which generates the output valid signal, and in the processing element, when a configuration of the processing element is updated by configuration data which makes the hold mode valid, the arithmetic processing circuit computes the input data signal while the input valid signal is invalid upon the update, and the output valid signal generation circuit outputs the output valid signal in response to a hold mode signal in synchronization with the output of the output data signal corresponding to the input data signal upon the update and when a configuration of the processing element is updated by configuration data which makes the hold mode invalid, the output valid signal generation circuit outputs the output valid signal in response to a valid input valid signal in synchronization with the output of the output data signal corresponding to the input data when the valid input valid signal is received.

6. The reconfigurable integrated circuit device according to claim 5, wherein the processing element further includes an input data holding register, in the processing element, when the configuration is updated by configuration data which makes the hold mode valid, an input data signal upon the update is held by the input data holding register and is output to the arithmetic processing circuit, and when the configuration is updated by configuration data which makes the hold mode invalid, the arithmetic processing circuit inputs an input data signal which is input after the update and performs computing processing, without using the input data holding register.

7. The reconfigurable integrated circuit device according to claim 5, wherein between a first context which includes a circuit configured by a first configuration data and a second context which follows the first context and includes a circuit configured by a second configuration data, upon update to the second context, an output data signal held by an output data holding register of a first processing element included in the first context is input by a second processing element which is included in the second context and is configured in the hold mode and computed by the arithmetic processing circuit.

8. The reconfigurable integrated circuit device according to claim 6, wherein between a first context which includes a circuit configured by a first configuration data and a second context which follows the first context and includes a circuit configured by a second configuration data, upon update to the second context, a first output data signal held by an output data holding register of a first processing element included in the first context is input by a second processing element which is included in the second context and is reconfigured in the hold mode then the arithmetic processing circuit starts computing processing, and the first output data signal upon the update is held in the input data holding register as an input data signal, and the input data signal held in the input data holding register is input in the arithmetic processing circuit.

9. A reconfigurable integrated circuit device, which is configured by configuration data, comprising:

a plurality of processing elements each of which includes an arithmetic circuit, and which are configured by the configuration data; and an inter-processing element network which connects the plurality of processing elements in a state configured by the configuration data, wherein the processing element inputs an input valid signal and an input data signal, and outputs an output valid signal and an output data signal, the processing element includes an input data holding register which holds the input data signal, an arithmetic processing circuit which computes the input data signal, and an output data holding register which holds the computing result data of the arithmetic processing circuit, and when a configuration of the processing element is updated by configuration data which makes a hold mode valid, the input data holding register holds the input data signal upon the update in response to a hold mode signal immediately after the update, the arithmetic processing circuit performs computing processing on the input data signal which is held in the input data holding register, and the processing element outputs the output valid signal in synchronization with the output of the output data signal corresponding to the computing result data in response to the hold mode signal even if the input valid signal is invalid.

10. The reconfigurable integrated circuit device according to claim 1, wherein when the configuration of the processor element is updated by configuration data that makes the hold mode valid, the processor element inputs an input data signal which is input upon the update to the arithmetic processing circuit without using the input data holding register, and then inputs the input data signal held in the input data holding register to the arithmetic processing circuit.

\* \* \* \* \*

UNITED STATES PATENT AND TRADEMARK OFFICE
CERTIFICATE OF CORRECTION

PATENT NO. : 9,552,328 B2  
APPLICATION NO. : 13/458255  
DATED : January 24, 2017  
INVENTOR(S) : Hayato Higuchi et al.

Page 1 of 1

It is certified that error appears in the above-identified patent and that said Letters Patent is hereby corrected as shown below:

In the Claims  
Column 15, Line 47 – Claim 1, delete "data" and insert -- data, --, therefore.  
Column 16, Line 40 – Claim 4, delete "data" and insert -- data, --, therefore.  
Column 17, Line 17 – Claim 5, before "computing" delete "the".  
Column 18, Line 36 – Claim 9, before "computing" delete "the".

Signed and Sealed this  
Thirteenth Day of March, 2018

Andrei Iancu  
*Director of the United States Patent and Trademark Office*